US012138793B2

(12) United States Patent
Bai et al.

(10) Patent No.: US 12,138,793 B2
(45) Date of Patent: Nov. 12, 2024

(54) MACHINE LEARNING METHODS AND APPARATUS FOR ROBOTIC MANIPULATION AND THAT UTILIZE MULTI-TASK DOMAIN ADAPTATION

(71) Applicant: GOOGLE LLC, Mountain View, CA (US)

(72) Inventors: Yunfei Bai, Union City, CA (US); Kuan Fang, Stanford, CA (US); Stefan Hinterstoisser, Muenchen, CA (US); Mrinal Kalakrishnan, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 1071 days.

(21) Appl. No.: 16/987,771

(22) Filed: Aug. 7, 2020

(65) Prior Publication Data
US 2020/0361082 A1   Nov. 19, 2020

Related U.S. Application Data

(63) Continuation of application No. 15/913,212, filed on Mar. 6, 2018, now Pat. No. 10,773,382.
(Continued)

(51) Int. Cl.
*B25J 9/16* (2006.01)
(52) U.S. Cl.
CPC ............. *B25J 9/163* (2013.01); *B25J 9/1612* (2013.01); *B25J 9/1669* (2013.01); *B25J 9/1671* (2013.01);
(Continued)

(58) Field of Classification Search
CPC ........ B25J 9/163; B25J 9/1612; B25J 9/1669; B25J 9/1671; B25J 9/1697;
(Continued)

(56) References Cited

U.S. PATENT DOCUMENTS 10,773,382 B2   9/2020   Bai et al.
2013/0343640 A1*  12/2013   Buehler ................... B25J 9/163
                                                  382/155
(Continued)

OTHER PUBLICATIONS

European Patent Office; Communication Pursuant to Article 94(3) EPC issue in Application No. 18779999.4; 5 pages; dated Oct. 7, 2021.
(Continued)

*Primary Examiner* — Basil T. Jos
(74) *Attorney, Agent, or Firm* — Gray Ice Higdon

(57) ABSTRACT

Implementations are directed to training a machine learning model that, once trained, is used in performance of robotic grasping and/or other manipulation task(s) by a robot. The model can be trained using simulated training examples that are based on simulated data that is based on simulated robot(s) attempting simulated manipulations of various simulated objects. Portion(s) of the model can also be trained based on real training examples that are based on data from real-world physical robots attempting manipulations of various objects. The simulated training examples can be utilized to train the model to predict an output that can be utilized in a particular task—and the real training examples used to adapt at least a portion of the model to the real-world domain can be tailored to a distinct task. In some implementations, domain-adversarial similarity losses are determined during training, and utilized to regularize at least portion(s) of the model.

20 Claims, 14 Drawing Sheets

Related U.S. Application Data

(60) Provisional application No. 62/559,279, filed on Sep. 15, 2017.

(52) U.S. Cl.
CPC ... *B25J 9/1697* (2013.01); *G05B 2219/39316* (2013.01); *G05B 2219/39536* (2013.01); *G05B 2219/39543* (2013.01); *G05B 2219/40514* (2013.01); *Y10S 901/02* (2013.01); *Y10S 901/31* (2013.01); *Y10S 901/47* (2013.01)

(58) Field of Classification Search
CPC ........... G05B 2219/39316; G05B 2219/39536; G05B 2219/39543; G05B 2219/40514; Y10S 901/02; Y10S 901/31; Y10S 901/47
See application file for complete search history.

(56) References Cited

U.S. PATENT DOCUMENTS

| | | |
|---|---|---|
| 2017/0252924 A1 | 9/2017 | Vijayanarasimhan et al. |
| 2018/0050451 A1 | 2/2018 | Takanishi et al. |

OTHER PUBLICATIONS

European Patent Office; Communication Pursuant to Article 94(3) EPC issue in Application No. 18779999.4; 4 pages; dated Oct. 18, 2023.
Pinto, L.; et al.; Supersizing Self-supervision: Learning to Grasp from 50K Tries and 700 Robot Hours; Robotics and Automation (ICRA); 8 pages; dated 2016.
Kappler, D. et al.; Leveraging Big Data for Grasp Planning; IEEE International Conference on Robotics and Automation; 9 Pages; dated 2015.
Saxena, A. et al.; Robotic Grasping of Novel Objects using Vison; The International Jounal of Robotics Research; vol. 27, No. 2; pp. 157-173; dated 2008.
Rusu, A. A. et al.; Sim-to-Real Robot Learning from Pixels with Progressive Nets; 1st Conference on Robot Learning; pp. 1-9; dated 2016.
Tobin, Josh, et al.; Domain Randomization for Transferring Deep Neural Networks from Simulation to the Real World; 8 pages; dated 2017.
James, S., et al.; Transferring end-to-end visuomotor control from simulation to real world for a multi-stage task; 1st Conference on Robot Learning; 10 pages; dated 2017.
Mahler, J. et al.; Dex-Net 2.0: Deep Learning to Plan Robust Grasps with Synthetic Point Clouds and Analytic Grasp Metrics; 12 pages; dated 2017.
Mereck, U. et al.; Learning a Visuomotor Controller for Real World Robotic Grasping using Simulated Depth Images; v 1st Conference on Robot Learning; 10 pages; dated 2017.
Pan, S.J. et al.; A Survey on Transfer Learning; IEEE, Transactions on Knowledge and Data Engineering; vol. 22, No. 10; pp. 1-15; dated 2010.
He, K., et al.; Mask r-cnn; pp. 1-12; dated 2017.
Bicchi, A.; On the Closure Properties of Robotic Grasping; The International Journal of Robotics Research; pp. 1-25; dated 1995.
Rodriguez, A., et al.; From Caging to Grasping; The International Journal of Robotics Research; vol. 31, No. 7; 8 Pages; dated 2012.
Bai, Y. et al.; Dexterous Manipulation Using Both Palm and Fingers; Robotics and Automation (ICRA); IEEE International Conference; 6 pages; dated 2014.
Bohg, J. et al.; Data-Driven Grasp Synthesis—A Survey; IEEE Transactions on Robotics; vol. 30, No. 2; pp. 1-21; dated 2014.
Jang, E.; et al.; End-to-End Learning of Semantic Grasping; Conference on Robotics Learning; pp. 1-14; dated 2017.
Taylor, M. E., et al.; Transfer Learning for Reinforcement Learning Domains: A survey; Journal of Machine Learning Research; vol. 10, No. Jul; pp. 1633-1685; dated 2009.
Sadeghi, F., et al.; Cad2rl: Real Single-image Flight without a Single Real Image; 12 pages; dated 2009.
Simard, P. Y., et al.; Best Practices for Convolutional Neural Networks Applied to Visual Document Analysis; ICDAR. Vol. 3; 6 pages; dated 2003.
Sun, B., et al.; Return of Frustratingly Easy Domain Adaptation; Proceedings of the Thirtieth AAAI Conference on Artificial Intelligence; pp. 2058-2065; dated 2016.
Gong, B., et al.; Geodesic Flow Kernel for Unsupervised Domain Adaptation; CVPR, IEEE; 8 pages; dated 2012.
Caseiro, R., et al.; Beyond the shortest path : Unsupervised Domain Adaptation by Sampling Subspaces Along the Spline Flow; CVPR; pp. 3846-3824; dated 2015.
Gopalan, R., et al.; Domain Adaptation for Object Recognition: An Unsupervised Approach; ICCV; 8 pages; dated 2011.
Ganin, Y., et al.; Domain-Adversarial Training of Neural Networks; Journal of Machine Learning Research; vol. 17, No. 59; pp. 1-35; dated 2016.
Long, M., et al.; Learning Transferable Features with Deep Adaptation Networks; ICML; 9 pages; dated 2015.
Tzeng, E., et al.; Deep Domain Confusion: Maximizing for Domain Invariance; 9 pages; dated 2014.
Bousmalis, K., et al.; Domain Separation Networks; Proc. Neural Information Processing Systems (NIPS); pp. 1-9; dated 2016.
Tzeng, E., et al.; Adapting Deep Visuomotor Representations with Weak Pairwise Constraints; Workshop on the Algorithmic Foudations of Robotics (WAFR); 16 pages; dated 2016.
Bousmalis, Konstantinos et al.; Using Simulation and Domain Adaptation to Improve Efficiency of Deep Robotic Grasping; 9 pages; dated 2017.
Girshick, R. B., et al.; Rich Feature Hierarchies for Accurate Object Detection and Semantic Segmentation; IEEE Conference on Computer Vision and Pattern Recognition; 8 pages; dated 2014.
He, K., et al.; Spatial Pyramid Pooling in Deep Convolutional Networks for Visual Recognition; IEEE Transactions on Pattern Analysis and Machine Intelligence; vol. 37; 14 pages; dated 2014.
Girshick, R. B.; Fast r-cnn; IEEE International Conference on Computer Vision (ICCV); pp. 1440-1448; dated 2015.
Ren, S., et al.; Faster R-CNN: Towards Real-Time Object Detection with Region Proposal Networks; Advances in Neural Information Processing Systems; p. 1-9; dated 2015.
Redmon, J., et al.; You only look once: Unified, real-time object detection; IEEE Conference on Computer Vision and Pattern Recognition (CVPR); pp. 779-788; dated 2016.
Shelhamer, E., et al.; Fully Convolutional Networks for Semantic Segmentation; IEEE Conference on Computer Vision and Pattern Recognition (CVPR); 12 pages; dated 2015.
Chen, L.-C., et al.; DeepLab: Semantic Image Segmentation with Deep Convolutional Nets, Atrous Convolution, and Fully Connected CRFs; IEEE transations on Pattern Analysis and Machine Intelligence; 14 pages; dated 2017.
Andrychowicz, M. et al.; Hindsight Experience Replay;31st Conference on Neural Information Processing Systems; 11 pages; dated 2017.
Ioffe, S., et al.; Batch Normalization: Accelerating Deep Network Training by Reducing Internal Covariate Shift; International Conference on Machine Learnig; pp. 1-11; dated 2015.
Ulyanov, D., et al.; Instance Normalization: The Missing Ingredient for Fast Stylization; p. 1-6; dated 2016.
Ba, J., et al.; Layer Normalization; p. 1-14; dated 2016.
Hinterstoisser, S., et al.; On Pre Trained Image Features and Synthetic Images for Deep Learning; pp. 1-12; dated 2017.
Rubinstein, R. Y., et al.; The corss-entropy method: A Unified Apporach to Monte Carlo Sinulation, Randomized Optimization and Machine Learning; Information Science & Statistics; Springer, 316 pages; dated 2004.
Coumans, E., et al.; Pybullet, aPython Module for Physics Simulation, Games, Robotics and Machine Learning; http://pybullet.org/; dated 2016.
Quinonero-Candela, J. et al.; Covariate Shift and Local Learning by Distribution Matching; pp. 131-160; dated 2008.
Redmon, J. et al.; "Real-Time Grasp Detection Using Convolutional Neural Networks"; 2015 IEEE International Conference on Robot-

(56) References Cited

OTHER PUBLICATIONS ics and Automation; XP055400236, ISSN: 0278-3649, DOI: 10.1177/0278364917710318; pp. 1316-1322 May 1, 2015.

Levine, S. et al.; "Learning Hand-Eye Coordination for Robotic Grasping with Deep Learning and Large-Scale Data Collection"; International Journal of Robotics Research; XP055400236, ISSN: 0278-3649, DOI: 10.1177/0278364917710318; 12 pages; dated Apr. 2, 2016.

European Patent Office; International Search Report and Written Opinion of PCT Ser. No. PCT/US2018/051175; 17 pages; dated Dec. 21, 2018.

European Patent Office; Intention to Grant issue in Application No. 18779999.4; 68 pages; dated Jul. 9, 2024.

\* cited by examiner

MACHINE LEARNING METHODS AND APPARATUS FOR ROBOTIC MANIPULATION AND THAT UTILIZE MULTI-TASK DOMAIN ADAPTATION

BACKGROUND

Many robots are programmed to utilize one or more end effectors to grasp one or more objects. For example, a robot may utilize a grasping end effector such as an "impactive" gripper or "ingressive" gripper (e.g., physically penetrating an object using pins, needles, etc.) to pick up an object from a first location, move the object to a second location, and drop off the object at the second location. Some additional examples of robot end effectors that may grasp objects include "astrictive" end effectors (e.g., using suction or vacuum to pick up an object) and one or more "contigutive" end effectors (e.g., using surface tension, freezing or adhesive to pick up an object), to name just a few.

Various machine learning based approaches to robotic grasping have been proposed. Some of those approaches train a machine learning model (e.g., a deep neural network) to generate one or more predictions that are utilized in robotic grasping, and train the machine learning model using training examples that are based only on data from real-world physical robots attempting robotic grasps of various objects. For example, the machine learning model can be trained to predict a likelihood of successful grasp at each of a plurality of iterations, based on a corresponding image for the iteration and a candidate motion vector for the iteration. The corresponding image can be a most recent image captured by a camera of a robot and the candidate motion vector can be a motion vector being considered for implementation by the robot. Based on the likelihood of successful grasp at each iteration, it can be determined whether to attempt a grasp or to instead implement the candidate motion vector and perform another iteration of predicting a likelihood of successful grasp.

However, these and/or other approaches can have one or more drawbacks. For example, generating training examples based on data from real-world physical robots requires heavy usage of one or more physical robots in attempting robotic grasps. This can be time-consuming (e.g., actually attempting a large quantity of grasps requires a large quantity of time), can consume a large amount of resources (e.g., power required to operate the robots), can cause wear and tear to the robots being utilized, and/or can require a great deal of human intervention (e.g., to place objects to be grasped, to remedy error conditions).

SUMMARY

This specification is directed generally to machine learning methods and apparatus related to manipulation of an object by an end effector of a robot. More particularly, implementations are directed to training a machine learning model (e.g., a deep neural network model) that, once trained, is used in performance of robotic grasping and/or other robotic manipulation task(s). Those implementations train the machine learning model using simulated training examples that are based on simulated data, where the simulated data is generated based on simulated robot(s) attempting simulated manipulations of various simulated objects. The simulated manipulations can be performed using one or more simulators each executing on one or more computing devices, and the simulated training examples generated based on generated output from the simulators in performance of the simulated manipulations. Those implementations further adapt at least portions of the trained machine learning model through training that is based on real training examples. The real training examples are based on data from real-world physical robots attempting manipulations of various objects. For example, weights of one or more portions of the machine learning model can be trained based on losses determined based at least in part on the real training examples. In some implementations, domain-adversarial similarity losses are determined during training based on application of the real training examples and simulated training examples, and are utilized to regularize the portion(s) of the machine learning model to enabling mapping of input(s) to the model into a similar feature space. In these and other manners, the trained machine learning model is adapted to the real-world domain, which improves performance of the trained machine learning model when utilized by a real-world physical robot in performance of a manipulation task.

In some implementations, the simulated training examples are utilized to train the machine learning model to predict an output that can be utilized in a particular task, such as an "instance grasping" task. "Instance grasping", as used herein, references grasping of a particular target object. In use of the trained machine learning model, the particular target object can be identified, for example, based on user interface input from a user, or based on output from a higher level task planner (e.g., that indicates "object X" should be grasped next). Instance grasping is contrasted from "indiscriminate grasping". "Indiscriminate grasping", as used herein, references grasping of an object without any regard to whether it is a target object.

In some of the implementations where the simulated training examples are utilized to train the machine learning model to predict an output that can be utilized in a particular task, the real training examples used to adapt at least a portion of the model to the real-world domain can be tailored to a distinct task. In other words, training examples for multiple tasks are utilized in training of the machine learning model that is adapted to the real-world domain. For example, where the particular task is "instance grasping", the real training examples can be tailored to a distinct "indiscriminate grasping" task. For example, the real training examples can each have labeled output that indicates whether any object was grasped (i.e., indiscriminate grasping), whereas the machine learning model is trained to predict whether a target object was grasped (i.e., instance grasping). Also, for example, the real training examples can lack any "segmentation mask" input (or other input that denotes position of a target object in an image), or all contain the same default/constant "segmentation mask" input, whereas the machine learning model is trained to accept "segmentation mask" input that is tailored to a target object to be grasped. In some of those implementations, additional simulated training examples can also be utilized to adapt the at least a portion of the model, and the additional simulated training examples can also be tailored to the distinct task. In some of those implementations, the domain-adversarial similarity losses are determined during training based on application of the real training examples and application of the additional simulated training examples, and are determined utilizing a domain classifier that predicts which domain an applied training example is from. Further, in some of those implementations, only a portion of the trained machine learning model is further trained based on the real training examples and/or the additional simulated training examples. For example, the trained portion of the trained machine learning model can be implemented in an additional machine learning model, and the real training examples and/or the additional simulated training examples applied to the additional machine learning model in adapting the portion of the trained machine learning model. Once adapted, the portion of the trained machine learning model can be implemented in the machine learning model, and used in control of one or more real physical robots.

In these and other manners, the machine learning model, that is trained based on the simulated training examples, is adapted to the real-world domain as a result of also being trained based on the real training examples. The quantity of real training examples utilized during training can be significantly reduced relative to approaches that rely solely on real training examples. This can reduce the amount of time utilized to generate training examples for training of the machine learning model, as the quantity of real training examples utilized during training is significantly reduced, and simulated grasp episodes can each be performed in less time than a corresponding real-world grasp episode. Moreover, simulated grasp episodes can be performed in parallel over multiple (e.g., hundreds of, thousands of) computing devices and/or processors, further increasing the time efficiency of generating the simulated grasp episodes. These and other considerations can lead to consumption of less resources (e.g., a simulated grasp episode can consume less power than a corresponding real-world grasp episode), can lead to less wear and tear on physical robots (e.g., due to reduction in the quantity of the real-world grasp episodes), and/or can require less human intervention (e.g., less oversight of the real-world grasp episodes). Further, as described herein, various implementations utilize a significant amount of simulated training data that is tailored to a particular task in training the machine learning model, and adapt the machine learning model through real training data that is not tailored to the particular task—and is instead tailored to a distinct task. The real training examples that are tailored to the distinct task can require less computing and/or human resources to generate, relative to training examples that are tailored to the particular task. In this manner, adaptation can be based on less resource intensive real training examples tailored to the distinct task, while requiring no (or minimal) more resource intensive real training examples that are tailored to the particular task.

As described above and elsewhere herein, some implementations are directed to training an "instance grasping" model to predict the probability that candidate motion data for an end effector of a robot will result in a successful grasp of a particular object. The instance grasping model can be a machine learning model, such as a deep neural network model that includes one or more convolutional neural network ("CNN") portions. As one example, some implementations enable applying, as input to a trained instance grasping model: (1) a candidate motion vector that defines a candidate motion (if any) of a grasping end effector of a robot, (2) a "current" image from a camera (or other vision component) of the robot (e.g., a "current" image from a camera mounted on an arm of the robot), (3) an "initial" image captured by the camera of the robot (e.g., captured at the start/beginning of a grasping episode), and (4) a segmentation mask for a particular target object (e.g., a segmentation mask that is determined based on the "initial" image and that indicates the position of the target object in the "initial" image); and generating, based on processing of the applied inputs using the trained instance grasping model: a measure that directly or indirectly indicates the probability that the candidate motion vector will result in a successful grasp of the target object.

Some implementations are directed to utilization of the trained instance grasping model to servo a grasping end effector of a robot to achieve a successful grasp, of a target object, by the grasping end effector. For example, the trained instance grasping model can be utilized in the iterative updating of motion control commands for one or more actuators of a robot that control the pose of a grasping end effector of the robot, and to determine when to generate grasping control commands to effectuate an attempted grasp by the grasping end effector. For instance, grasping control commands may only be generated and provided to corresponding actuators when output generated over the trained instance grasping model indicates that a likelihood of successful grasp of a target object satisfies a threshold.

The above description is provided as an overview of some implementations of the present disclosure. Further description of those implementations, and other implementations, are described in more detail below.

In some implementations, a method implemented by one or more processors is provided and includes identifying a simulated training example generated based on simulated data. The simulated data is generated during performance of a simulated robotic manipulation episode in which a simulated robot manipulates a simulated object in a simulated environment. The simulated training example includes simulated training example input and simulated training example output. The simulated training example output is based on whether a first robotic manipulation task was successful for the simulated robotic manipulation episode. The method further includes identifying a real training example generated based on real data. The real data is generated during performance of a real robotic manipulation episode in which a real robot manipulates a real object. The real training example includes real training example input and real training example output. The real training example output is based on whether a second robotic manipulation task was successful for the real robotic manipulation episode. The second robotic manipulation task is distinct from the first robotic manipulation task. The method further includes: applying the simulated training example input to a machine learning model; generating a first predicted output based on processing of the simulated training example input using the machine learning model; and generating a first loss based on comparing the first predicted output to the simulated training example output that is based on whether the first robotic manipulation task was successful. The method further includes: applying the real training example input to the machine learning model, or to an additional machine learning model that includes a portion of the machine learning model; generating a second predicted output based on processing of the real training example input using the machine learning model or the additional machine learning model; and generating a second loss based on comparing the second predicted output to the real training example output that is based on whether the second robotic manipulation task was successful. The method further includes training at least the portion of the machine learning model based on both the first loss and the second loss.

In some implementations, a method implemented by one or more processors is provided and includes generating a first predicted output based on processing of simulated training example input, of a simulated training example, using a machine learning model. The method further includes generating a first loss based on comparing the first predicted output to simulated training example output of the simulated training example. The simulated training example output can be for a first robotic manipulation task. The method further includes generating a second predicted output based on processing of real training example input, of a real training example, using the machine learning model or an additional machine learning model that includes a portion of the machine learning model. The method further includes generating a second loss based on comparing the second predicted output to real training example output of the real training example. The real training example output can be for a second robotic task that is distinct from the first robotic task. The method further includes training at least the portion of the machine learning model based on both the first loss and the second loss.

In some implementations, a method implemented by one or more processors is provided and includes identifying an image captured by a vision component associated with the robot. The method further includes identifying a target object captured by the image and generating a target object input that denotes position of the target object in the image. The method further includes generating a candidate end effector motion vector defining motion to move a grasping end effector of a robot from a current pose to an additional pose. The method further includes identifying a current image captured by the vision component, where the current image captures the grasping end effector and at least the target object. The method further includes processing the current image, the candidate end effector motion vector, and the target object input using a trained instance grasping model. The method further includes generating, based on the processing, a prediction of successful grasp of the target object with application of the motion defined by the candidate end effector motion vector. The method further includes generating an end effector command based on the prediction of successful grasp of the target object, and providing the end effector command to one or more actuators of the robot.

Other implementations may include a non-transitory computer readable storage medium storing instructions executable by one or more processors (e.g., central processing unit(s) (CPU(s)), graphics processing unit(s) (GPU(s)), and/or tensor processing unit(s) (TPU(s)) to perform a method such as one or more of the methods described above and/or elsewhere herein. Yet other implementations may include a system of one or more computers and/or one or more robots that include one or more processors operable to execute stored instructions to perform a method such as one or more of the methods described above and/or elsewhere herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Learning-based approaches to robotic manipulation can be limited by the scalability of data collection. For many challenging manipulation tasks, repeatedly running robot experiments, on real physical robots, to collect training data is infeasible. Implementations described herein present a multi-task transfer learning framework for instance grasping (and/or other robotic tasks) in cluttered scenes by utilizing simulated robot experiments. Implementations train and utilize a machine learning model (e.g., a neural network model) that takes, at each time step, images, a motion vector, and an instance segmentation mask of a specified target object (or other input that denotes position of the specified target object) as inputs, and predicts the likelihood of successful grasp of the target object at each time step. Implementations of the proposed transfer learning framework presented herein train a machine learning model for a first robotic task (e.g., an instance grasping task) based on simulated training examples that are based on the first robotic task, and use a domain-adversarial loss to transfer the trained neural network model to a real-world domain using training examples that are based on a distinct second robotic task (e.g., an indiscriminate grasping task). The training examples that are based on the distinct second robotic task can include both simulated and real training examples. In other words, implementations herein present a multi-task domain adaptation framework that enables training of a model that can be utilized to perform a first robotic task (e.g., an instance grasping task) using a real-world physical robot, without using any (or minimal) real-world training examples for the first robotic task.

Figure 1A:
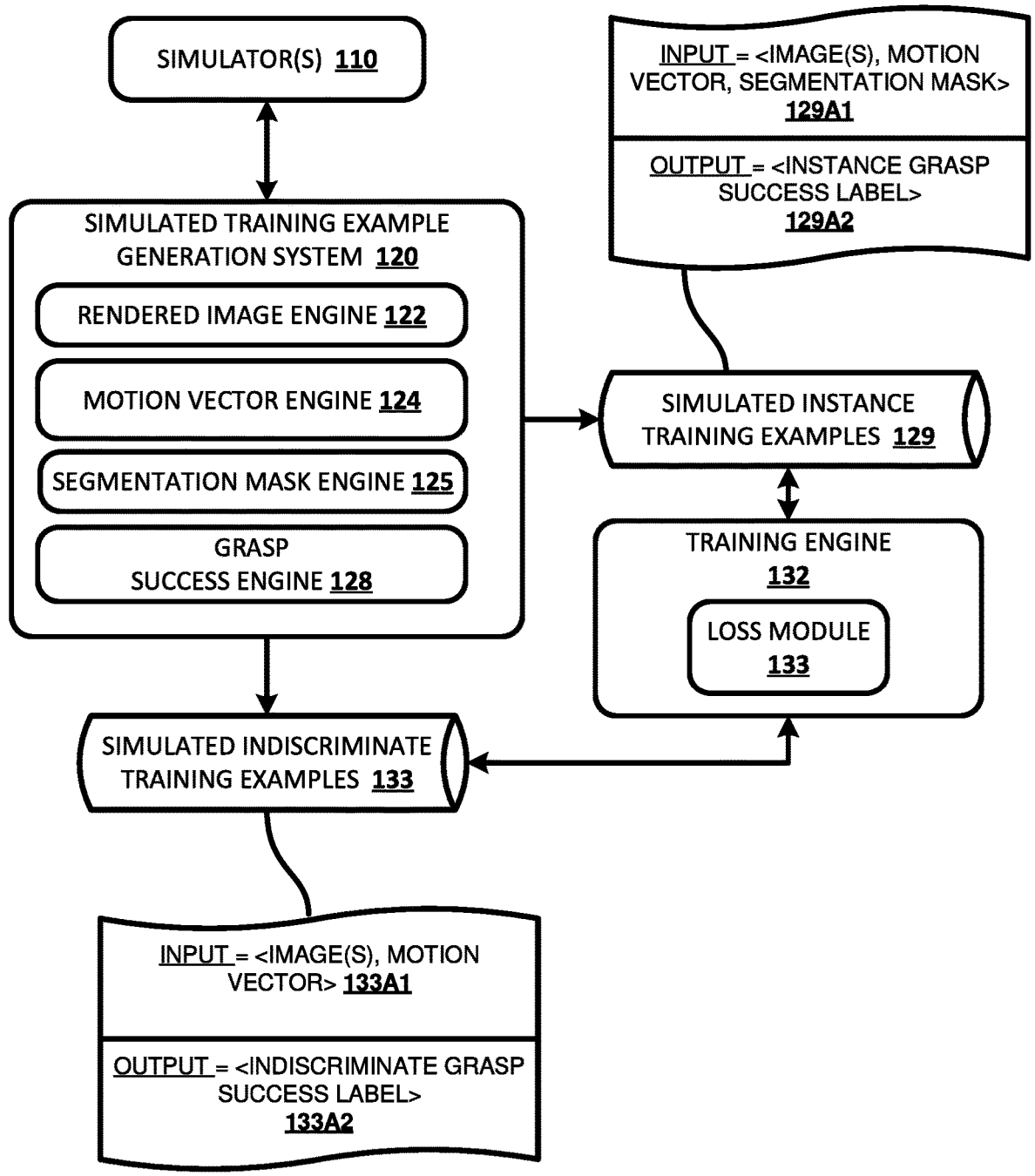
FIG. 1A illustrates an example environment in which simulated grasp episodes can be performed and simulated instance training examples and/or simulated indiscriminate training examples can be generated based on the simulated grasp episodes.

Turning now to the figures, FIG. 1A illustrates an example environment in which simulated grasp episodes can be performed, and in which simulated instance training examples 129 and/or simulated indiscriminate training examples 133 can be generated.

FIG. 1A includes a simulated instance training example generation system 120, which is implemented by one or more computer systems. The simulated training example generation system 120 interfaces with one or more simulators 110 in generating simulated instance training examples 129. The simulator(s) 110 are also implemented by one or more computer systems, which can be the same and/or different from computer system(s) used to implement the simulated training example generation system 120. The simulator(s) 110 can be used to simulate various environments that include corresponding environmental objects, to simulate a robot operating in the environment, to simulate responses of the robot in response to virtual implementation of various simulated robotic actions, and to simulate interactions between the robot and the environmental objects in response to the simulated robotic actions. Various simulators can be utilized, such as physics engines that simulates collision detection, soft and rigid body dynamics, etc. One non-limiting example of such a simulator is the BULLET physics engine.

The simulated training example generation system 120 includes a rendered image engine 122, a motion vector engine 124, a segmentation mask engine 125, and a grasp success engine 128. The system 120 causes a large number (e.g., thousands, hundreds of thousands, millions) of simulated grasp episodes to be performed utilizing the simulator(s) 110. Each simulated grasp episode can be performed in a corresponding simulated environment with corresponding simulated environmental objects present. The simulated environment and/or simulated environmental objects can be varied among the grasp episodes. For example, a first set of one or more simulated grasp episodes can occur with 5 simulated plates, 3 simulated forks, 4 simulated cups, and a simulated napkin. The starting poses of one or more of the environmental objects can optionally vary between one or more of the grasp episode(s) of the first set. A second set of one or more simulated grasp episodes can occur with 8 simulated forks and 2 simulated cups. The starting poses of one or more of the objects can optionally vary between one or more of the grasp episode(s) of the second set.

Each simulated grasp episode consists of T separate time steps or instances. At the start of each simulated grasp episode, the simulated robot is in a corresponding starting pose. The starting poses can differ among various simulated grasp episodes. For example, the starting pose of each simulated grasp episode can be randomly or pseudo-randomly selected for each simulated grasp episode. At each time step of the simulated grasp episode, a simulated robot action is determined and implemented. The simulated robot action causes an end effector of the simulated robot to move in the simulated environment. For example, the simulated robot action can cause the end effector to move translationally and/or rotationally. Each of the simulated robot actions can optionally be randomly or pseudo-randomly determined. At a final time step T, an end effector of the simulated robot is actuated to attempt a grasp. For example, for a simulated gripper end effector having two opposed "grasping members", the grasping members can be actuated to cause them to "close" (e.g., move closer together) until they are touching, are applying at least a threshold level of force to a simulated environmental object, and or other criterion/criteria are satisfied.

The success of a simulated grasp episode attempt by one of the simulators 110 can be evaluated by the grasp success engine 128 of the simulated training example generation system 120. For example, the grasp episode can be considered successful if the simulator indicates that, after actuating the grasping members, the grasping members are both contacting a simulated environmental object. In some implementations, the success of the grasp episode can be determined based on causing the end effector to further move, in the simulator, after the grasping members are closed and/or are applying force to a contacted object (if any). For example, the simulated robot can optionally be further controlled in the simulator to move the end effector "up", and it can be determined if any simulated object moves with the end effector in the simulator. If so, the simulated grasp episode can be considered successful.

The simulated training example generation system 120 can generate simulated instance training examples 129 based on simulated grasp episodes. For example, if the grasp success engine 128 determines a simulated grasp episode resulted in a successful grasp, the system 120 can utilize buffered (or otherwise stored) data from the simulator for the grasp episode to generate a plurality of positive training examples, and optionally a plurality of negative training examples. For example, the rendered image engine 122 can generate a rendered image for the start of the simulated grasp episode, and can generate a rendered image for each of the time steps of the simulated grasp episode. The rendered images can be rendered from a point of view of a simulated camera of the robot, such as a simulated stationary camera—or a simulated non-stationary camera, such as a simulated non-stationary camera attached to one of the links of the simulated robot. For example, the rendered images can each be rendered from the point of view of a simulated non-stationary camera that is attached to one of the simulated links, and whose pose (relative to a world frame) therefore varies during the simulated grasp episode as that simulated link moves. Further, the rendered images for each time step can be based on data from the simulator for that time step (e.g., taken from the pose of the simulated camera at that time step, and capturing the simulated robot and simulated environment at that time step). The rendered images can be, for example, two-dimensional ("2D") images with multiple color channels (e.g., red, green, and blue ("RGB")). Also, for example, the images can instead be two-and-a-half dimensional ("2.5D") images with RGB and depth channels. As yet another example, the images can instead be a 2.5D point cloud (e.g., X, Y, and Z positions (and optionally intensity) but without any color channels).

The motion vector engine 124 can generate a motion vector for each of the time steps of the simulated grasp episode. The motion vector generated for each time step can be a task-space motion vector from a pose of the simulated end effector at that time step to the final pose of the simulated end effector. The final pose of the simulated end effector can be the pose of the end effector at the final time step of the simulated grasp episode (e.g., the time step when the grasp is attempted). For example, for a given time step the motion vector engine 124 can determine a transformation between the current pose of the simulated end effector at the time step and the final pose of the simulated end effector, and use the transformation as the motion vector.

The segmentation mask engine 125 can generate a segmentation mask based on the rendered image for the start of the simulated grasp episode (generated by rendered image engine 122). For a positive simulated instance training example, the segmentation mask is a segmentation mask of the successfully grasped object, in the rendered image for the start of the simulated grasp episode. For example, the successfully grasped object can be detected in the rendered image based on knowing an identifier of the successfully grasped object in the simulation data, and determining a pose of the successfully grasped object at the start of the simulated grasp episode based on the simulation data. In other words, the successfully grasped object can be localized in a rendered image for the start of the grasp episode based on the pose of that object at the start as indicated by the simulation data, and based on knowing that object is the successfully grasped object (e.g., based on the determination by grasp success engine 128). The segmentation mask can correspond to the detected successfully grasped object in the rendered image at the start of the simulated grasp episode. For example, the segmentation mask can have the same dimensions as the rendered image, but can include only a single channel with first values (e.g., "1s") where the successfully grasped object is present in the rendered image, and second values (e.g., "0s") at all other locations.

Alternative segmentation mask values/techniques can be utilized, such as techniques that have additional value(s) (e.g., value(s) between "0" and "1") near the edges of the successfully grasped object, or techniques that include a first value (e.g., "1") in only some locations where the successfully grasped object is present in the rendered image (e.g., a "1" or other value in only a subset of (e.g., only one of) multiple pixels corresponding to the successfully grasped object in the rendered image). Yet another example of alternative techniques that can be utilized include a two-dimensional bounding box (or other shape) that indicates the pixels that encompass all or portions of the object. For instance, the bounding box (or other shape) can be provided as an input that indicates the dimensions and position of the bounding box (or other shape) relative to an image (e.g., an input that identifies a "center" pixel of the bounding box, and the size of the bounding box). Also, for instance, the bounding box can be provided as a segmentation mask that has first values (e.g., "1s") corresponding to the bounding box and second values (e.g., "0s") at all other locations. Such alternative techniques still denote position of the successfully grasped object for positive training examples, and can likewise be utilized to denote position of another object (that is not the successfully grasped object) for negative training examples.

For a negative simulated instance training example, the segmentation mask is a segmentation mask of another simulated environmental object (that is not the successfully grasped object), in the rendered image for the start of the simulated grasp episode. In other words, the segmentation mask for positive training examples is a segmentation mask of the successfully grasped object, whereas the segmentation mask for negative training examples is a segmentation mask of another object that is not the successfully grasped object.

The grasp success engine 128 can generate a positive instance grasp success label (e.g., "1") for positive training examples, and a negative instance grasp success label (e.g., "0") for negative training examples.

Accordingly, for a successful simulated grasp episode, T positive simulated instance training examples can be generated, each represented by ($I_0$, $I_i$, $p_i-p_T$, $M_g$, $INSTL_p$), where $I_0$ is the rendered image at the start of the episode, $I_i$ is the rendered image for a corresponding time step, $p_i$ is the pose of the end effector at the corresponding time step, $p_T$ is the pose of the end effector at the final time step (accordingly, $p_i-p_T$ represents an end effector motion vector for the corresponding time step), $M_g$ is a segmentation mask of the successfully grasped object, and $INSTL_p$ is a positive instance grasp success label.

Further, for a successful simulated grasp episode, T negative training examples can be generated for a given "ungrasped" object, each represented by ($I_0$, $I_i$, $p_i-p_T$, $M_u$, $INSTL_n$), where $I_0$ is the rendered image at the start of the episode, $I_i$ is the rendered image for a corresponding time step, $p_1$ is the pose of the end effector at the corresponding time step, $p_T$ is the pose of the end effector at the final time step (accordingly, $p_i-p_T$ represents an end effector motion vector for the corresponding time step), $M_u$ is a segmentation mask of another simulated object that is not the successfully grasped object, and $INSTL_n$ is a negative instance grasp success label.

The simulated training example generation system 120 stores generated simulated instance training examples 129 in one or more databases. An example of one of the generated simulated instance training examples 129 is illustrated in FIG. 1A. The example includes simulated instance training example input 129A1 that includes rendered image(s) (e.g., a rendered "starting" image, and a rendered image for a corresponding time step of the training example), a motion vector for the time step, and a segmentation mask (for a successfully grasped object if the training example is positive, for a non-successfully grasped object if the training example is negative). The example also includes simulated instance training example output 129A2 that is the instance grasp success label for the training example.

Figure 2A:
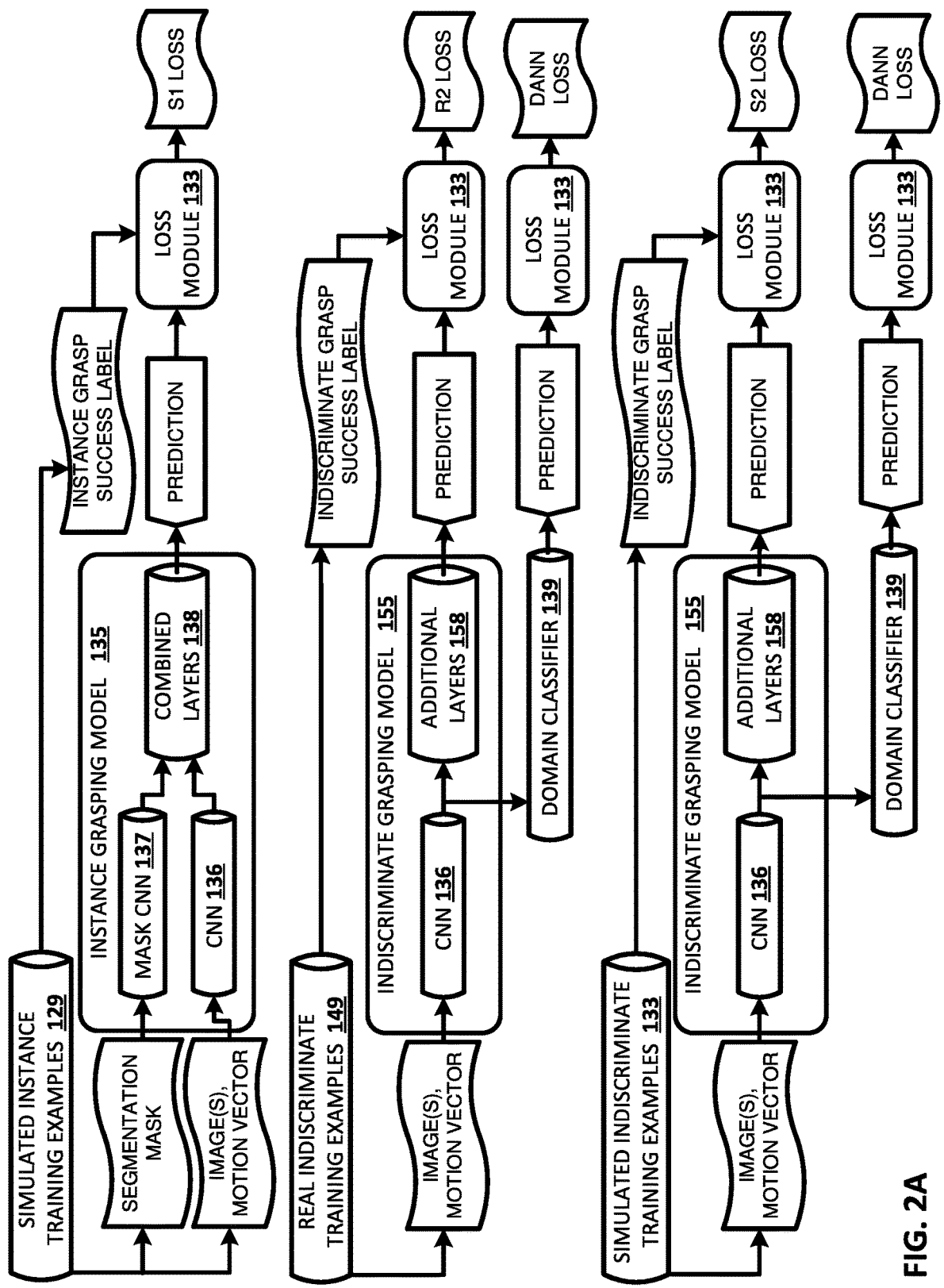
FIG. 2A illustrates an example of how an instance grasping model can be trained utilizing simulated instance training examples, real indiscriminate training examples, and simulated indiscriminate training examples—and utilizing an indiscriminate grasping model.
Figure 2B:
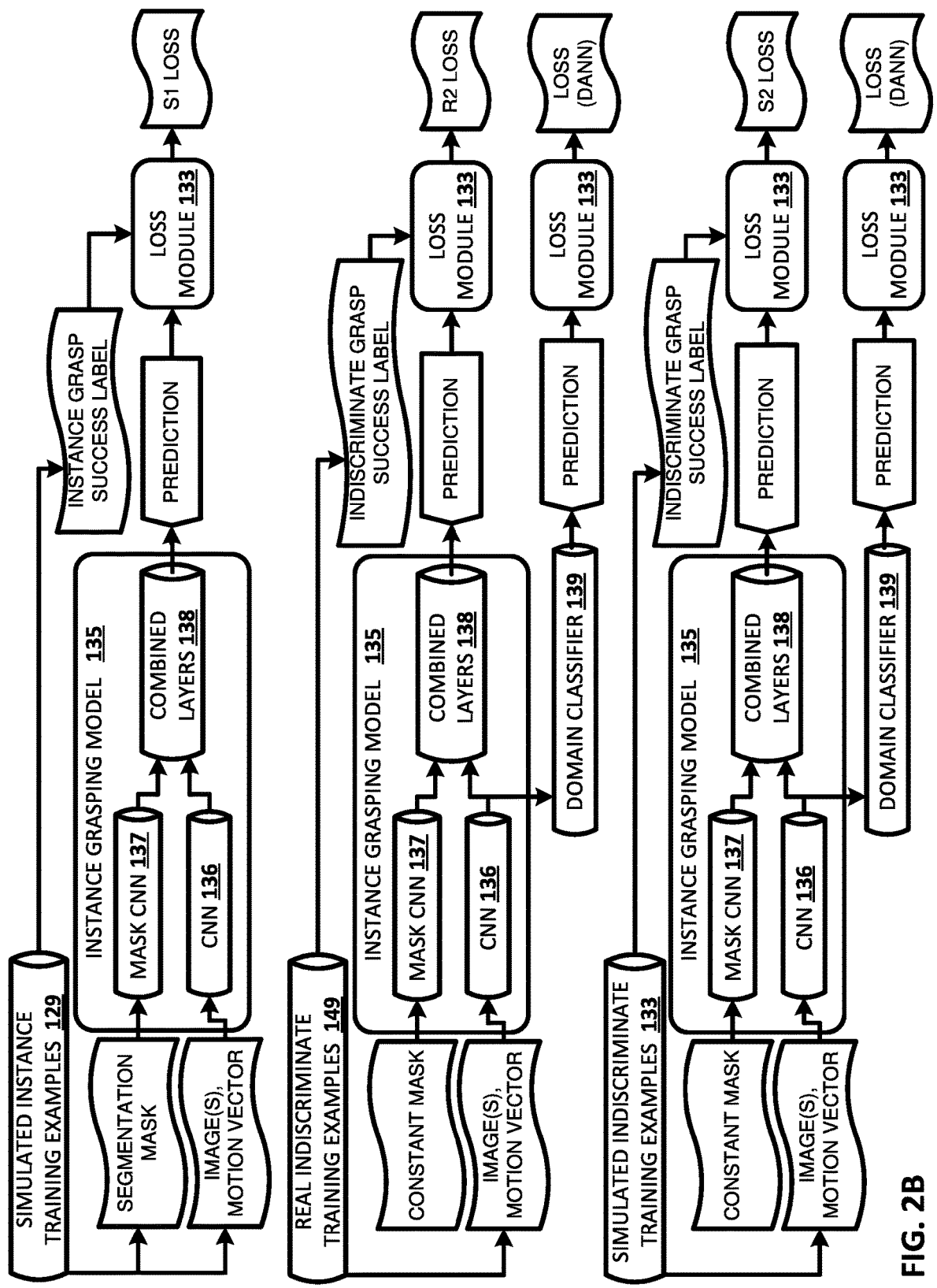
FIG. 2B illustrates an example of how an instance grasping model can be trained utilizing simulated instance training examples, real indiscriminate training examples, and simulated indiscriminate training examples.
Figure 2C:
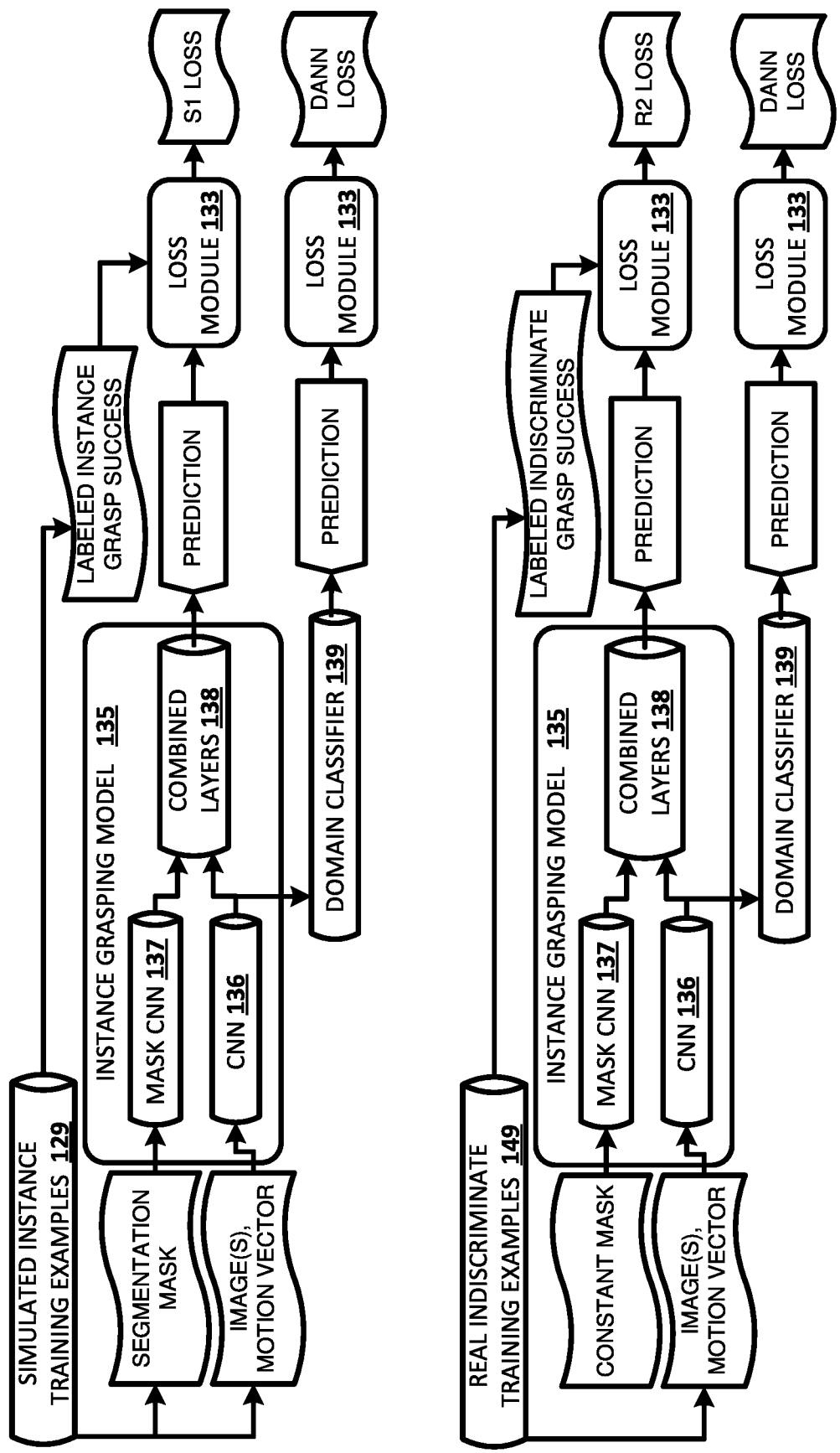
FIG. 2C illustrates an example of how an instance grasping model can be trained utilizing simulated instance training examples and real indiscriminate training examples.

As described in more detail with respect to FIGS. 2A-2C, the training engine 132 can utilize the simulated instance training examples in training of an instance grasping model. Additional description of generating simulated instance training examples is provided below with respect to method 300 of FIG. 3 and method 400 of FIG. 4.

The simulated training example generation system 120 can optionally also generate simulated indiscriminate training examples 133 based on simulated grasp episodes. The same simulated grasp episodes utilized to generate the simulated instance training examples 129 can optionally also be utilized to generate one or more of the indiscriminate training examples 133.

Compared to the simulated instance training examples, the simulated indiscriminate training examples 133 can lack any segmentation mask in the training example input (or can each contain a default/constant mask). Moreover, the grasp success label of the simulated indiscriminate training examples 133 indicates whether any object was successfully grasped—not whether a particular object was successfully grasped.

The grasp success engine 128 generates positive indiscriminate training examples based on data from successful simulated grasp episodes (in which any object was successfully grasped) and generates negative indiscriminate training examples based on unsuccessful simulated grasp episodes (in which no object was grasped). For a successful simulated grasp episode, T positive indiscriminate training examples can be generated, each represented by ($I_0,I_i,p_i-p_T$, $INDL_p$), where $I_0$ is the rendered image at the start of the episode, $I_i$ is the rendered image for a corresponding time step, $p_i$ is the pose of the end effector at the corresponding time step, $p_T$ is the pose of the end effector at the final time step (accordingly, $p_i-p_T$ represents an end effector motion vector for the corresponding time step), and $INDL_p$ is a positive indiscriminate grasp success label.

Further, for an unsuccessful simulated grasp episode, T negative training examples can be generated each represented by ($I_O$, $I_t$, $p_t-p_T$, $INDL_n$), where $I_O$ is the rendered image at the start of the episode, $I_t$ is the rendered image for a corresponding time step, $p_t$ is the pose of the end effector at the corresponding time step, $p_T$ is the pose of the end effector at the final time step, and $INDL_n$ is a negative indiscriminate grasp success label.

The simulated training example generation system 120 stores generated simulated indiscriminate training examples 133 in one or more databases. An example of one of the generated simulated indiscriminate training examples 133 is illustrated in FIG. 1A. The example includes simulated indiscriminate training example input 133A1 that includes rendered image(s) (e.g., a rendered "starting" image, and a rendered image for a corresponding time step of the training example), and a motion vector for the time step. The example also includes simulated indiscriminate training example output 133A2 that is the indiscriminate grasp success label for the training example.

As described in more detail with respect to FIGS. 2A and 2B, the training engine 132 can utilize the simulated indiscriminate training examples in training at least a portion of an instance grasping model.

Figure 1B:
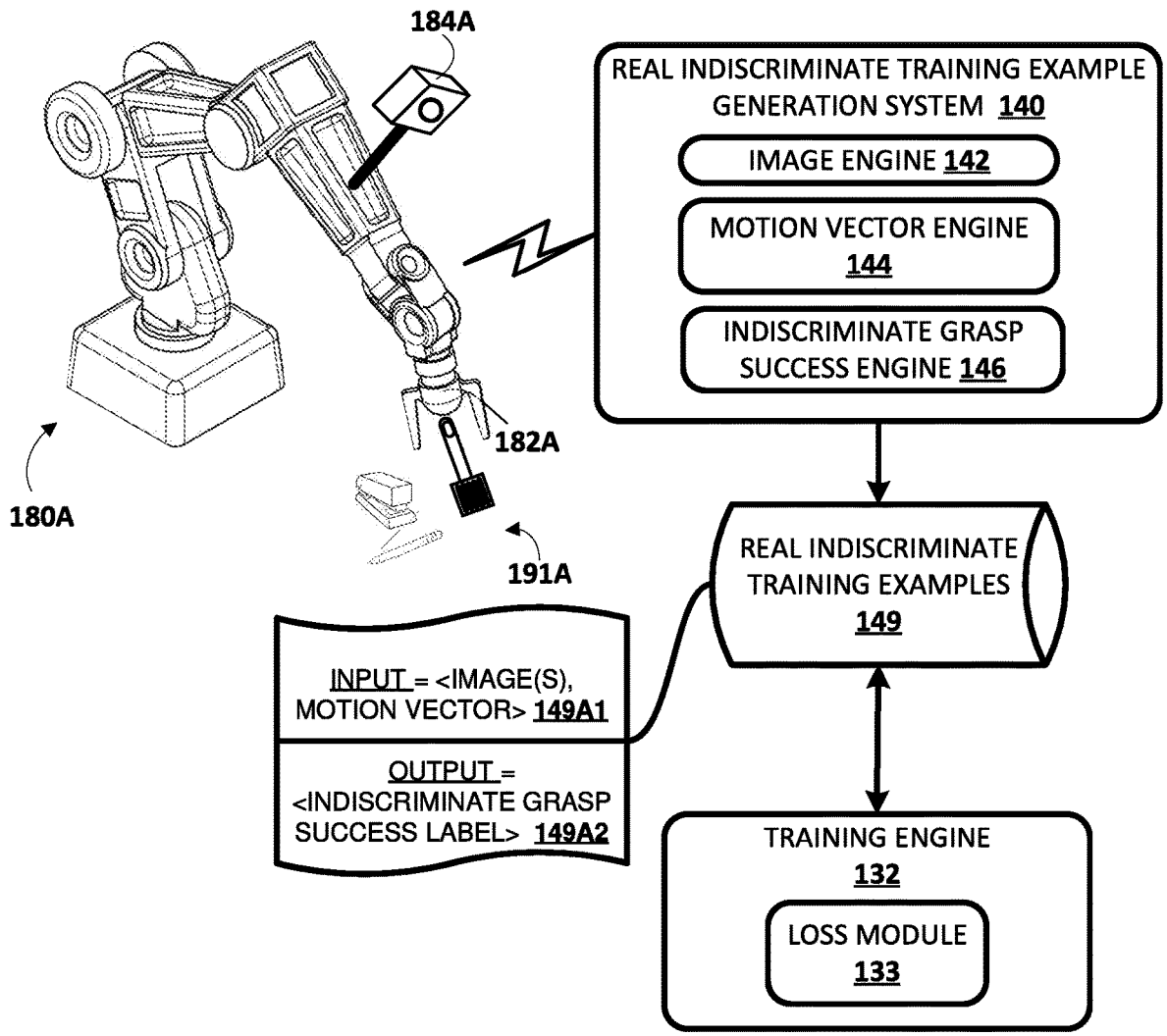
FIG. 1B illustrates an example environment in which grasp episodes may be performed by real robot(s), and data associated with the grasp episodes may be utilized to generate real indiscriminate training examples.

FIG. 1B illustrates an example environment in which grasp episodes may be performed by real robot(s), and data associated with the grasp episodes may be utilized to generate real indiscriminate training examples.

Example robot 180A is illustrated in FIG. 1B. The same and/or similar robot can be simulated by the simulator 110 of FIG. 1B in performance of simulated grasp episodes. Robot 180A is a "robot arm" having multiple degrees of freedom to enable traversal of grasping end effector 182A along any of a plurality of potential paths to position the grasping end effector 182A in desired locations. Robot 180A further controls two opposed "claws" of grasping end effector 182A to actuate the claws between at least an open position and a closed position (and/or optionally a plurality of "partially closed" positions).

Example vision component 184A is also illustrated in FIG. 1B. In FIG. 1B, vision component 184A is mounted on a link of the robot 180A. The pose of the vision component 184A therefore changes as the pose of that link moves. Further, the vision component 184A can also optionally independently adjust its pose relative to that link (e.g., pan and/or tilt). In other implementations, the vision component 184A may be coupled to another link of the robot and/or provided near the robot (but not coupled to the robot) and/or at a fixed pose relative to the base or other stationary reference point of robot 180A. Vision component 184A generates images related to shape, color, depth, and/or other features of object(s) that are in the line of sight of the sensors. The vision component 184A can be, for example, a monographic camera (e.g., generating 2D RGB images), a stereographic camera (e.g., generating 2.5D RGB images), and/or a laser scanner (e.g., generating a 2.5D "point cloud"). It is understood that in many implementations the rendered images of the simulated data will be rendered to be of the same type as the images generated by the vision component 184A. For example, both may be 2.5D RGB images.

The vision component 184A has a field of view of at least a portion of the workspace of the robot 180A, such as the portion of the workspace that includes example objects 191A. Although resting surface(s) for objects 191A are not illustrated in FIG. 1B, those objects may rest on a table, a tray, and/or other surface(s). Objects 191A include a spatula, a stapler, and a pencil. In other implementations more objects, fewer objects, additional objects, and/or alternative objects may be provided during all or portions of grasp episodes of robot 180A as described herein. Although a particular robot 180A is illustrated in FIG. 1B, additional and/or alternative robots may be utilized, including additional robot arms that are similar to robot 180A, robots having other robot arm forms, robots having a humanoid form, robots having an animal form, robots that move via one or more wheels, an unmanned aerial vehicle ("UAV"), and so forth. Also, although a particular grasping end effector is illustrated in FIG. 1B, additional and/or alternative end effectors may be utilized, such as alternative impactive grasping end effectors (e.g., those with grasping "plates", those with more or fewer "digits"/"claws"), "ingressive" grasping end effectors, "astrictive" grasping end effectors, "contigutive" grasping end effectors, or non-grasping end effectors.

Robot 180A and/or other robots can be utilized to perform grasp episodes and data associated with the grasp episodes may be utilized by the real indiscriminate training example generation system 140 to generate real indiscriminate training examples 149, and store them in one or more databases. In some implementations, all or aspects of system 140 may be implemented on robot 180A (e.g., via one or more processors of robot 180A). In some implementations, all or aspects of system 140 may be implemented on one or more computing devices that are separate from, but in network communication with, robot 180A.

Each grasp episode by robot 180A and/or other robots consists of T separate time steps or instances. At each time step, a current image captured by the vision component of the robot performing the grasp episode is stored, the current pose of the end effector is also stored, and the robot chooses a path (translational and/or rotational) along which to next move the gripper. At the final time step T, the robot actuates (e.g., closes) the gripper and stores additional data and/or performs one or more additional actions to enable evaluation of the success of the grasp. The indiscriminate grasp success engine 146 of system 140 evaluates the success of the grasp, generating an indiscriminate grasp success label.

The indiscriminate grasp success engine 146 can utilize one or more techniques to determine whether a grasp episode was successful. For example, torque, position and/or other sensors of the end effector 182A can be monitored during a grasp episode and/or after a grasp episode (e.g., when moving up following a grasp episode) to determine whether an object is likely grasped by the grasp episode. For instance, a successful grasp can be determined if a position sensor indicates a distance, between grasping members of the end effector, that is greater than some threshold (e.g., 1 cm) after a grasp episode (and before dropping)—and may determine an unsuccessful grasp label if the distance is less than some threshold (e.g., 1 cm). Also, for example, image(s) from before and after the grasping attempt can be compared to determine whether object(s) have moved substantially (which can indicate a successful grasp). Also, for example, image(s) can be sent to human reviewer(s), who can indicate whether the grasp was successful.

Real indiscriminate training examples can be generated by the system 140 based on the real grasp episode. For a successful grasp episode, T positive real indiscriminate training examples can be generated, each represented by ($I_O$, $I_t$, $p_t-p_T$, $INDL_p$), where $I_O$ is the image captured by vision sensor at the start of the episode, $I_t$ is the captured image for a corresponding time step, $p_1$ is the pose of the end effector at the corresponding time step, $p_T$ is the pose of the end effector at the final time step (accordingly, $p_t$–$p_T$ represents an end effector motion vector for the corresponding time step), and $INDL_p$ is a positive indiscriminate grasp success label. For an unsuccessful grasp episode, T negative real indiscriminate training examples can be generated, having the same format as the positive real indiscriminate training examples, but including a negative indiscriminate success label in lieu of the positive label.

The images of the training examples can be determined by the image engine 142 of system 140. The end effector motion vector can be determined by the motion vector engine 144 of system 140. For example, for a given training example, the motion vector engine 144 can determine a transformation between the pose of the end effector at a time step of the given training example and the final pose of the grasp episode, and use the transformation as the end effector motion vector.

In some implementations, the indiscriminate grasp success label determined by the indiscriminate grasp success engine 146 is a binary label, such as a "0/successful" or "1/not successful" label. In some implementations, the indiscriminate grasp success label may be selected from more than two options, such as 0, 1, and one or more values between 0 and 1. For example, "0" may indicate a confirmed "not successful grasp", "1" may indicate a confirmed successful grasp, "0.25" may indicate a "most likely not successful grasp" and "0.75" may indicate a "most likely successful grasp."

The real indiscriminate training example generation system 140 stores generated real indiscriminate training examples 149 in one or more databases. An example of one of the generated real indiscriminate training examples 149 is illustrated in FIG. 1B. The example includes real indiscriminate training example input 149A1 that includes image(s) (e.g., a captured "starting" image, and a captured image for a corresponding time step of the training example), and a motion vector for the time step. The example also includes real indiscriminate training example output 149A2 that is the indiscriminate grasp success label for the training example.

As described in more detail with respect to FIGS. 2A-2C, the training engine 132 can utilize the real indiscriminate training examples in training of an instance grasping model. Additional description of generating real indiscriminate training examples is provided below with respect to method 600 of FIG. 6 and method 700 of FIG. 7.

Turning now to FIGS. 2A-2C, additional description is provided of implementations of training an instance grasping model utilizing simulated instance training examples and real indiscriminate training examples, to achieve a trained model that is adapted to the real-world domain and that can be utilized in the control of real physical robots.

FIG. 2A illustrates an example of how an instance grasping model 135 can be trained utilizing simulated instance training examples 129, real indiscriminate training examples 149, and simulated indiscriminate training examples 133—and utilizing an indiscriminate grasping model 155.

At the top of FIG. 2A is an instance grasping model 135. The instance grasping model 135 includes a first branch that is a CNN portion 136 that includes a plurality of convolutional layers. The instance grasping model 135 also includes a second branch that is a mask CNN portion 137 that also includes a plurality of convolutional layers. The output of CNN portion 136 and the output of mask CNN portion 137 are both connected to the input of combined layers 138. For example, in use, output generated based on processing of data over CNN portion 136 can be concatenated with output generated based on processing of separate data over mask CNN portion 137—and the concatenated outputs can be applied as input to combined layers 138. The combined layers 138 can include, for example, one or more fully connected layers.

In training of instance grasping model 135, it is trained based in part on losses that are generated based on applying simulated instance training examples 129 to the instance grasping model 135. For example, as illustrated in FIG. 2A, a segmentation mask from training example input of one of the simulated instance training examples 129 is applied to the mask CNN portion 137 and processed over the mask CNN portion 137 to generate output. Further, rendered image(s) and a motion vector from the simulated instance training example is applied to the CNN portion 136 and processed over the CNN portion 136 to generate output. For example, an image from the instance of the training example and a "start" image from the grasp episode of the training example can be applied to an initial layer of the CNN portion 136 (e.g., the image from the instance and the "start" image can be concatenated and applied), and the motion vector can be applied as a "side input" to one or more layers of the CNN portion 136 that are "downstream" from the initial layer. The outputs from the portions 136 and 137 are concatenated and applied to the combined layers 138. The concatenated outputs are processed over the combined layers 138 to generate a prediction, that is an instance grasping prediction (i.e., a likelihood of grasp of the particular object indicated by the applied segmentation mask). The loss module 133 of training engine 132 (FIG. 1) compares the generated prediction to an instance grasp success label from the training example to generate a S1 loss. Here, the loss is denoted as "S1" to indicate that it's based on a simulated training example (S) and that the training example is for a first task (1), namely "instance grasping".

The S1 loss can be backpropagated over the entire instance grasping model 135 and can update weights of the entire model. For example, the S1 loss can be applied to the end layer of the combined layers 138, and backpropagated over additional layer(s) of the combined layers 138, and over the CNN portion 136 and the mask CNN 137. Training the instance grasping model 135 based on the S1 loss trains the instance grasping model to predict, based on an applied segmentation mask and applied image(s) and motion vector, a likelihood that implementing the motion vector and subsequently grasping will result in a successful grasp of the particular target object indicated in the segmentation mask.

A single simulated instance training example is illustrated in FIG. 2A as being applied to the instance grasping model 135, and only a single S1 loss is illustrated. However, it is understood that a large quantity of simulated instance training examples and corresponding losses will be utilized in training the instance grasping model 135. Moreover, in some implementations batch training techniques can be utilized, where each S1 loss that is utilized in backpropagation is based on determined individual losses from processing of multiple simulated instance training examples.

In FIG. 2A, two instances of an indiscriminate grasping model 155 are also illustrated. The indiscriminate grasping model 155 includes the CNN portion 136 of instance grasping model 135. For example, the CNN portion 136 of indiscriminate grasping model 155 can be a different instance of the CNN portion 136 of instance grasping model 135, but can share weights with the CNN portion of the instance grasping model 135. For instance, the weights of all instances of the CNN portion 136 can be updated simultaneously in response to backpropagation based on various losses described with respect to FIG. 2A. The indiscriminate grasping model 155 also includes additional layers 158. In FIG. 2A, the additional layers 158 do not share any weights with the instance grasping model 135 and can optionally be structurally different than the combined layers 138 of instance grasping model 135. Moreover, it is noted that in FIG. 2A the indiscriminate grasping model 155 lacks any mask CNN portion.

As illustrated in FIG. 2A, captured image(s) and a motion vector from one of the real indiscriminate training examples 149 is applied to the CNN portion 136 of one instance of the indiscriminate grasping model 155 and processed over the CNN portion 136 to generate output. The output from the CNN portion 136 is applied to the additional layers 158, and is processed over the additional layers 158 to generate a prediction, that is an indiscriminate grasping prediction (i.e., a likelihood of grasp of any object). The loss module 133 of training engine 132 (FIG. 1) compares the generated prediction to an indiscriminate grasp success label from the real indiscriminate training example to generate a loss R2. Here, the loss is denoted as "R2" to indicate that it's based on a real training example (R) and that the training example is for a second task (2), namely "indiscriminate grasping".

The loss R2 can be backpropagated over the entire indiscriminate grasping model 155 and used to update the entire model (including the shared CNN portion 136). For example, the loss R2 can be applied to the end layer of the additional layers 158, and backpropagated over the additional layers 158, and over the CNN portion 136. Training the indiscriminate grasping model 155 based on loss R2 trains the indiscriminate grasping model 155 to predict, based on an applied image(s) and a motion vector, a likelihood that implementing the motion vector and subsequently grasping will result in a successful grasp of any object. Training the shared CNN portion 136 based on loss R2 adapts the CNN portion 136 in the instance grasping model 135, and mitigates the domain shift between simulation and the real-world.

In some implementations, and as also illustrated in FIG. 2A, a domain adversarial neural network (DANN) loss is also generated along with the loss R2 and can be used in backpropagation and updating of domain classifier 139 and of CNN portion 136 (without application to or updating of additional layers 158). For example, the DANN loss can be a domain adversarial similarity loss utilized to adjust the R2 loss that is applied to the CNN portion 136. For instance, the DANN loss can penalize the R2 loss when domain shift (between the simulated and real domains) is detected. The DANN loss can be generated based on applying the output from the CNN portion 136 (the same output applied to the additional layers 158) to the domain classifier 139, and processing the output over the domain classifier 139 to generate a prediction, where the prediction predicts the domain of the training example (e.g., real or simulated). The domain classifier 139 can include, for example, one or more fully connected layers.

The loss module 133 generates the DANN loss by comparing the prediction domain to an actual domain of the training example. For example, if the prediction predicted that the training example is 95% likely from the real domain, and it is from the real domain (i.e., it came from real indiscriminate training examples 149), the DANN loss can penalize the R2 loss applied to CNN portion 136 more severely than if the prediction instead predicted that the training example is 95% likely from the simulated domain, but it was actually from the real domain. Use of the DANN loss can encourage the CNN portion 136 to extract features that cause the domain classifier 139 to be unable to accurately predict the correct domain. This further regularizes the CNN portion 136 weights to map simulated and real-world images into a similar feature space.

A single real indiscriminate training example is illustrated in FIG. 2A as being applied to the indiscriminate grasping model 155, and only a single loss R2 and single DANN loss for the training example are illustrated. However, it is understood that a large quantity of real indiscriminate training examples and corresponding R2 and DANN losses will be utilized in training. Moreover, in some implementations batch training techniques can be utilized, where each R2 and/or DANN loss that is utilized in backpropagation is based on determined individual losses from processing of multiple simulated instance training examples.

In FIG. 2A, an additional instance of the indiscriminate grasping model 155 is also illustrated in combination with processing of simulated indiscriminate training examples 133. The additional instance can fully share weights with the other instance. As a result, the CNN portion 136 of the additional instance also shares weights with the CNN portion of instance grasping model 135—and the additional layers 158 of both instances of the indiscriminate grasping model 155 also share weights. In other implementations, the same instance of the indiscriminate grasping model 155 can be utilized to process both simulated and real indiscriminate training examples.

As illustrated in FIG. 2A, rendered image(s) and a motion vector from one of the simulated indiscriminate training examples 133 is applied to the CNN portion 136 of indiscriminate grasping model 155 and processed over the CNN portion 136 to generate output. The output from the CNN portion 136 is applied to the additional layers 158, and is processed over the additional layers 158 to generate a prediction, that is an indiscriminate grasping prediction (i.e., a likelihood of grasp of any object). The loss module 133 of training engine 132 (FIG. 1) compares the generated prediction to an indiscriminate grasp success label from the simulated indiscriminate training example to generate an S2 loss. Here, the loss is denoted as "S2" to indicate that it's based on a simulated training example (S) and that the training example is for a second task (2), namely "indiscriminate grasping".

The S2 loss can be backpropagated over the entire indiscriminate grasping model 155 and used to update the entire model (including the shared CNN portion 136). For example, the S2 loss can be applied to the end layer of the additional layers 158, and backpropagated over additional layer(s) of the additional layers 158, and over the CNN portion 136. Training the indiscriminate grasping model 155 based on loss S2 trains the indiscriminate grasping model to predict, based on an applied image(s) and motion vector, a likelihood that implementing the motion vector and subsequently grasping will result in a successful grasp of any object. Training the shared CNN portion 136 based on loss S2 adapts the CNN portion 136 in the instance grasping model 135, and mitigates the domain shift between simulation and the real-world.

In some implementations, and as also illustrated in FIG. 2A, an additional domain adversarial neural network (DANN) loss is also generated along with the loss S2 and can be used in backpropagation and updating of domain classifier 139 and CNN portion 136 (without application to additional layers 158). For example, the DANN loss can be as described above, and the utilized domain classifier 139 can be the same as that used above and/or another instance with shared weights.

In training the instance grasping model 135 of FIG. 2A, multiple S1 losses, R2 losses (and optionally corresponding DANN losses), and S2 losses (and optionally corresponding DANN losses) can be utilized. The S1 losses are utilized to update all parameters of the instance grasping model 135. The other losses are utilized in updating only the CNN portion 136 of the network. Training can proceed with the objective of minimizing a loss function that is a function of the S1, R2, S2, and DANN losses. Such a loss function can optionally weight one or more losses differently. For example, the S1 loss can be weighted more heavily than one or more (e.g., all) of the other losses. Training based on the various losses can occur sequentially and/or in parallel. For example, the instance grasping model 135 can be trained based on a very large quantity of S1 losses that are based on a very large quantity of simulated instance training examples 129. After and/or during such training, the shared CNN portion 136 can also be trained based on R2, S2, and/or DANN losses as described above.

FIG. 2B illustrates an example of how the instance grasping model 135 can be trained utilizing simulated instance training examples 129, real indiscriminate training examples 149, and simulated indiscriminate training examples 133.

Three separate instances of instance grasping model 135 are illustrated in FIG. 2B. All instances can fully share weights with one another. In other implementations, only a single instance is provided, and the single instance is utilized in generating the various losses of FIG. 2B.

At the top of FIG. 2B, an S1 loss is generated based on applying simulated instance training examples 129 to the instance grasping model 135. The S1 loss can be generated in the same manner as described above with respect to FIG. 2A.

In the middle of FIG. 2B, the instance grasping model 135 is being utilized to generate an R2 loss and DANN loss (whereas the separate indiscriminate grasping model 155 was being utilized in FIG. 2A). As illustrated in FIG. 2B, captured image(s) and a motion vector from one of the real indiscriminate training examples 149 is applied to the CNN portion 136 and processed over the CNN portion 136 to generate output. A "constant" segmentation mask is applied to the mask CNN portion 137 and processed over the mask CNN portion 137 to generate output. The constant segmentation mask can be, for example, a segmentation mask with all "0s" or all "1s". The constant segmentation mask is not tailored to any target object to be grasped, as the real indiscriminate training examples 149 lack any such data. The outputs from the portions 136 and 137 are concatenated and applied to the combined layers 138. The concatenated outputs are processed over the combined layers to generate a prediction. The loss module 133 of training engine 132 (FIG. 1) compares the generated prediction to an indiscriminate grasp success label from the training example to generate a R2 loss. Here, the loss is denoted as "R2" to indicate that it's based on a real training example (R) and that the training example is for a second task (2), namely "indiscriminate grasping".

The R2 loss can be backpropagated over the entire instance grasping model 135 and can update weights of the entire model. For example, the R2 loss can be applied to the end layer of the combined layers 138, and backpropagated over additional layer(s) of the combined layers 138, and over the CNN portion 136 and the mask CNN 137. Training the instance grasping model 135 based on the R2 loss adapts the model to the real-world domain. In some implementations, and as also illustrated in FIG. 2B, an additional domain adversarial neural network (DANN) loss is also generated along with the loss R2 and can be used in backpropagation and updating of domain classifier 139 and of CNN portion 136 (optionally without application to or updating of combined layers 1388). For example, the DANN loss can be a domain adversarial similarity loss utilized to adjust the R2 loss that is applied to the CNN portion 136. For instance, the DANN loss can penalize the R2 loss when domain shift is detected. The DANN loss can be generated as described above.

As illustrated at the bottom of FIG. 2B, the instance grasping model 135 is also being utilized to generate an S2 loss and DANN loss based on the simulated indiscriminate training examples 133 (whereas the separate indiscriminate grasping model 155 was being utilized in FIG. 2A). This can be similar to the generation of the R2 loss based on the instance grasping model 135 as described above, but utilizes a training example from simulated indiscriminate training examples 133 instead of from real indiscriminate training examples 149.

In training the instance grasping model 135 of FIG. 2A, multiple S1 losses, R2 losses (and optionally corresponding DANN losses), and S2 losses (and optionally corresponding DANN losses) can be utilized. The S1 losses are utilized to update all parameters of the instance grasping model 135. The S2 and R2 losses can also be utilized to update all parameters of the instance grasping model 135. The DANN losses can be utilized in updating only the CNN portion 136 of the network. Training can proceed with the objective of minimizing a loss function that is a function of the S1, R2, S2, and DANN losses. Such a loss function can optionally weight one or more losses differently. Training based on the various losses can occur sequentially and/or in parallel.

FIG. 2C illustrates an example of how an instance grasping model can be trained utilizing simulated instance training examples and real indiscriminate training examples. FIG. 2C is similar to FIG. 2B. However, no simulated indiscriminate training examples are utilized (and therefore no S2 loss and/or associated DANN loss). Moreover, a DANN loss is also being generated, and utilized, in training of instance grasping model 135 based on simulated instance training examples 129. The DANN loss can be generated and applied in a manner similar to that described above.

Turning now to FIGS. 3-9, various example methods are described with reference to operations of flow charts of those figures. For convenience, the operations of the flow charts described below are described with reference to a system that performs the operations. The system can include one or more components of a robot and/or one or more components of a separate computing system. Moreover, different systems can perform the operations of different flowcharts. Additionally, while the operations of the flowcharts are shown in a particular order, this is not meant to be limiting. One or more operations may be reordered, omitted or added.

Figure 3:
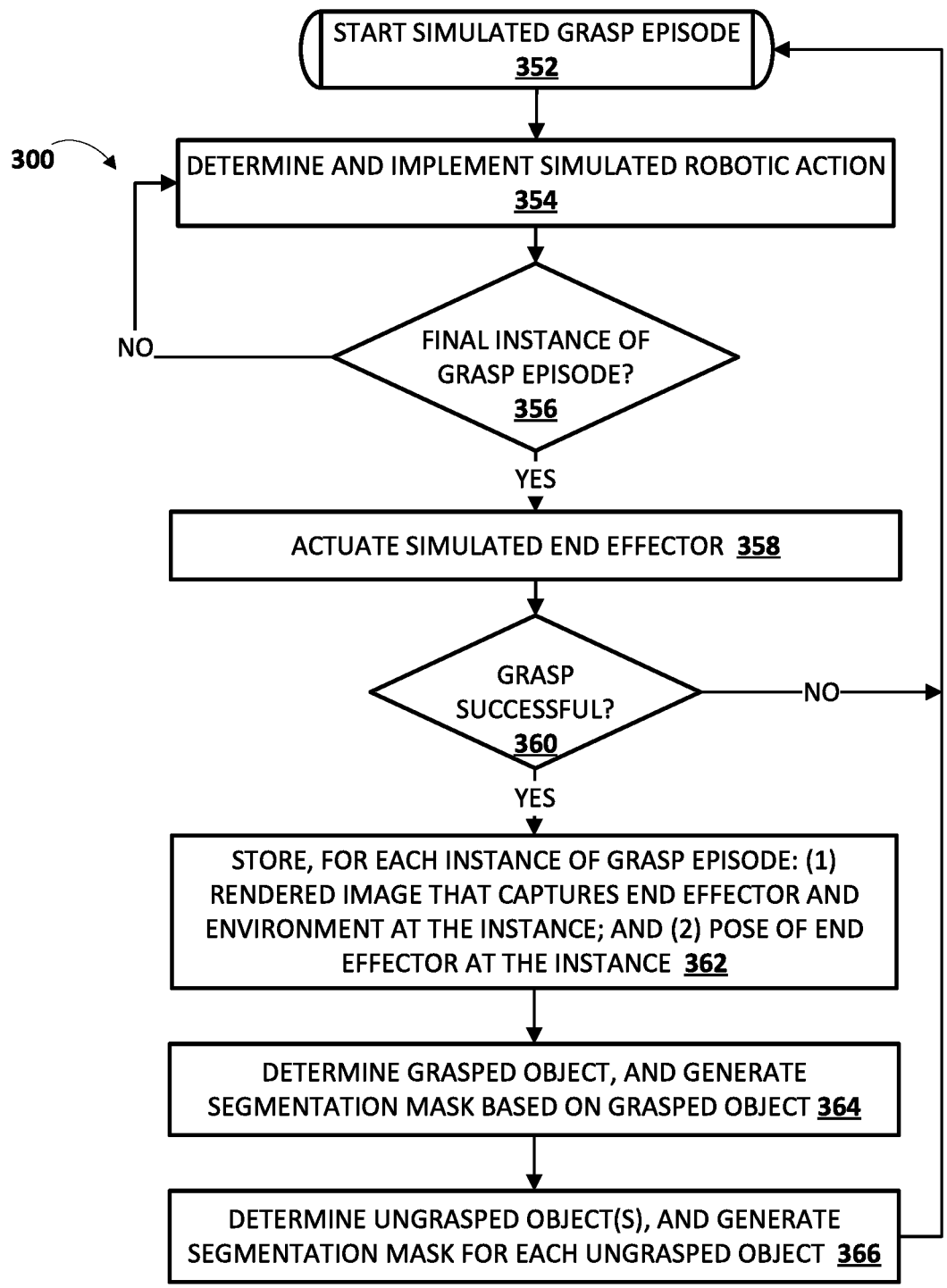
FIG. 3 is a flowchart illustrating an example method of performing simulated grasp episodes and storing data associated with the simulated grasp episodes.

FIG. 3 is a flowchart illustrating an example method 300 of performing simulated grasp episodes and storing data associated with the simulated grasp episodes.

At block 352, the system starts a simulated grasp episode.

At block 354, the system determines and implements a simulated robotic action.

At block 356, the system determines whether the simulated robotic action is a final instance of the simulated grasp episode. For example, the system can determine whether a threshold of instances have been performed, whether a threshold amount of time has passed, whether a threshold number of computing cycles have been performed, and/or other criterion/criteria has been met.

If, at an iteration of block 356, it is determined that the simulated robotic action is not a final instance of the simulated grasp episode, the system returns to block 354 to determine and implement an additional simulated robotic action.

If, at an iteration of block 356, it is determined that the simulated robotic action is a final instance of the simulated grasp episode, the system proceeds to block 358 and actuates a simulated end effector.

At block 360, the system determines whether actuating the simulated end effector in block 358 produces a successful grasp.

If the system determines at block 360 that the grasp is unsuccessful, the system can proceed to block 352 and start another grasp episode. If the system determines at block 360 that the grasp is successful, the system continues to block 362, where it stores, for each instance of a grasp episode: (1) a rendered image that captures end effector and environment at the instance; and (2) a pose of the end effector at the instance.

At block 364, the system determines a grasped object (that was grasped in the successful grasp), and generates a segmentation mask based on the grasped object. For example, the system can generate the segmentation mask based on the grasped object and a rendered image for the start of the grasp episode.

At block 366, the system determines one or more ungrasped objects, and generates a segmentation mask for each of the ungrasped object(s).

The system can store the segmentation mask that is based on the grasped object, and the segmentation mask that is based on the ungrasped object, and then proceeds back to block 352 to start another simulated grasp episode.

Figure 4:
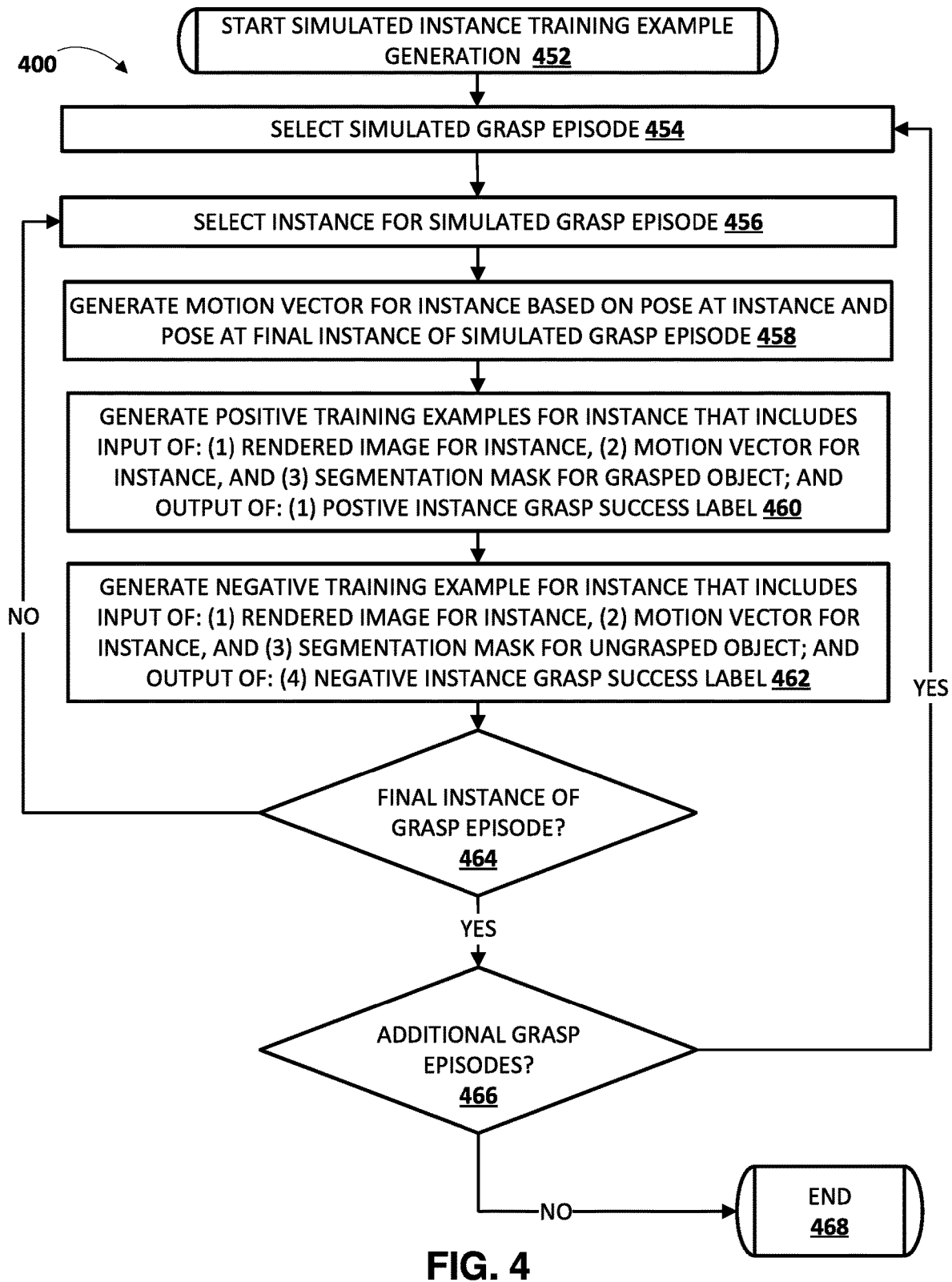
FIG. 4 is a flowchart illustrating an example method of generating simulated instance training examples based on stored data associated with simulated grasp episodes.

FIG. 4 is a flowchart illustrating an example method 400 of generating simulated instance training examples based on stored data associated with simulated grasp episodes.

At block 452, the system starts simulated instance training example generation.

At block 454, the system selects a simulated grasp episode. For example, the system may access a database that includes data associated with a plurality of stored simulated grasp episodes, and select one of the stored simulated grasp episodes. The selected simulated grasp episode may be, for example, a simulated grasp episode generated based on the method 300 of FIG. 3.

At block 456, the system selects an instance for the simulated grasp episode. For example, the system may select data associated with the instance based on a timestamp and/or other demarcation associated with the data that differentiates it from other instances of the grasp episode.

At block 458, the system generates a motion vector for the instance based on a pose at the instance and a pose at a final instance of the simulated grasp episode.

At block 460, the system generates a positive training example for the instance that includes input of: (1) a rendered image for the instance, (2) a motion vector generated for the instance at block 458, and (3) a segmentation mask for a grasped object of the corresponding grasp episode; and output of: (1) a positive instance grasp success label.

At block 462, the system generates a negative training example for the instance that includes input of: (1) a rendered image for the instance, (2) a motion vector generated for the instance at block 458, and (3) a segmentation mask for an ungrasped object; and output of: (1) a negative instance grasp success label. In some implementations, the training example input for the positive and negative training examples further includes an additional rendered image, such an additional rendered image from the start of the grasp episode to which the instance belongs.

At block 464, the system determines whether the selected simulated instance is the final instance of the simulated grasp episode. If the system determines the selected simulated instance is not the final instance of the simulated grasp episode, the system returns to block 456 and selects another instance for the simulated grasp episode.

If, at block 464, the system determines the selected instance is the final instance of the simulated grasp episode, the system proceeds to block 466 and determines whether there are additional grasp episodes to process. If the system determines there are additional grasp episodes to process, the system returns to block 454 and selects another simulated grasp episode. In some implementations, determining whether there are additional grasp episode to process may include determining whether there are any remaining unprocessed grasp episodes. In some implementations, determining whether there are additional grasp episodes to process may additionally and/or alternatively include determining whether a threshold number of simulated instance training examples has already been generated and/or other criteria has been satisfied.

If the system determines there are not additional simulated grasp episodes to process, the system proceeds to block 468 and the method 400 ends. Another iteration of method 400 may be performed again.

Figure 5:
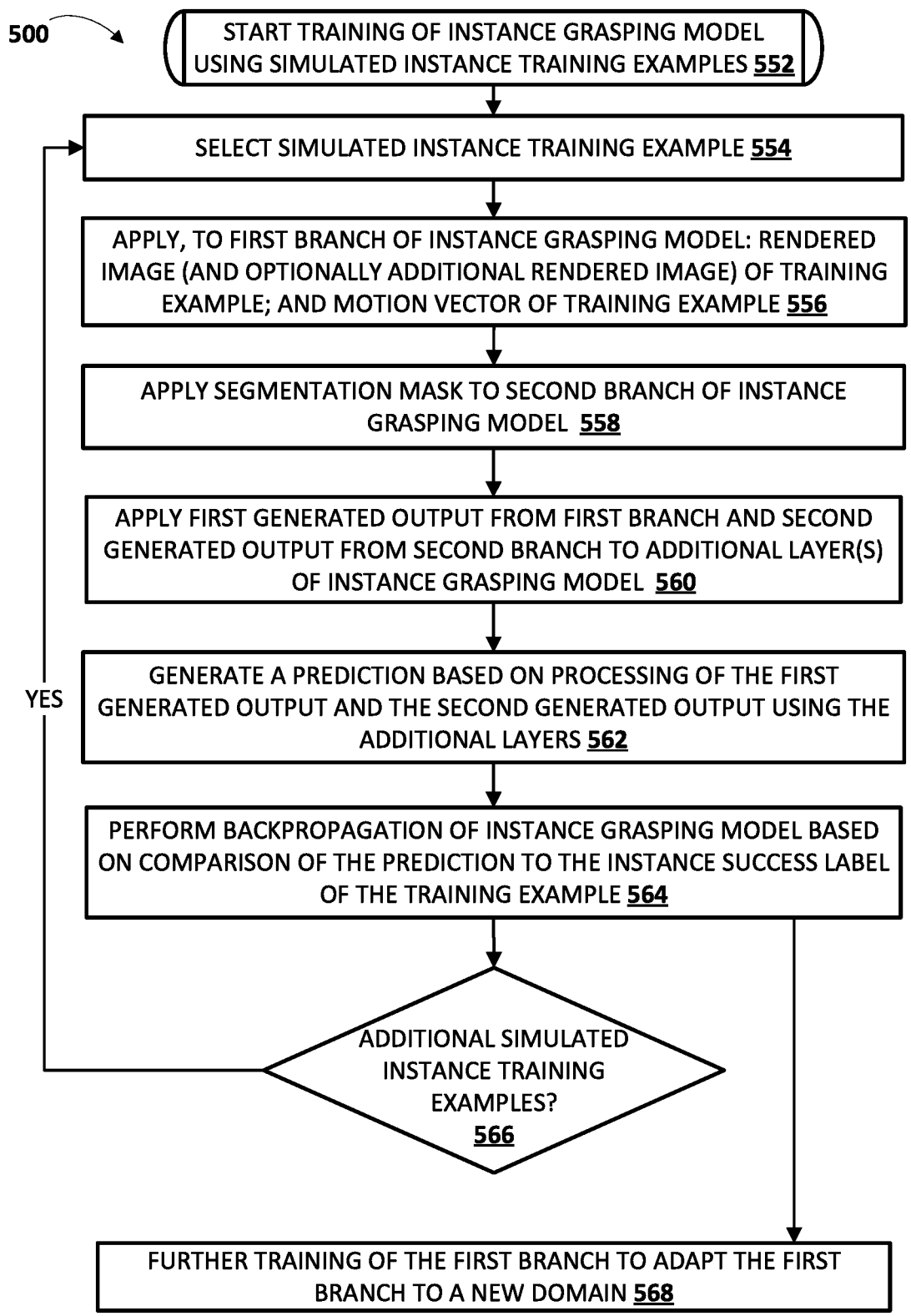
FIG. 5 is a flow chart illustrating an example method of training an instance grasping model using simulated instance training examples.

FIG. 5 is a flow chart illustrating an example method 500 of training an instance grasping model using simulated instance training examples.

At block 552, the system starts training of an instance grasping model using simulated instance training examples.

At block 554, the system selects a simulated instance training example. For example, the system may select a simulated instance training example generated based on the method 400 of FIG. 4.

At block 556, the system applies, to a first branch of an instance grasping model, a rendered image (and optionally one or more additional rendered images) of the training example, and a motion vector or the training example. As described herein, in some implementations the rendered image and an additional "start" image for the training example are applied to as input to an initial layer of the first branch, and the motion vector is applied as side input to a downstream layer of the first branch. For example, the two images can be concatenated, applied to the initial layer, and processed over the initial layer and optionally one or more additional layers to generate intermediate output. The motion vector can then be concatenated with the intermediate output and the concatenation applied to one or more additional layers of the first branch.

At block 558, the system applies a segmentation mask of the training example to a second branch of the instance grasping model.

At block 560, the system applies first generated output from the first branch and second generated output from the second branch to additional layer(s) of the instance grasping model. For example, the system can concatenate the first and second outputs, and apply the concatenated outputs to the additional layer(s).

At block 562, the system generates a prediction based on processing of the first generated output and the second generated output using the additional layers.

At block 564, the system performs backpropagation of the instance grasping model based on comparison of the prediction to the instance success label of the training example.

At block 566, the system determines whether there are additional simulated instance training examples. If so, the system can proceed back to block 554, select an additional simulated instance training example, and further train the instance grasping model based on the additional simulated instance training example.

As indicated at block 568, the system can also perform further training, of at least the first branch of the instance grasping model, to adapt at least the first branch to a new domain. For example, the system can perform further training utilizing real discriminative training examples and optionally utilizing simulated discriminative training examples. One example of this is described in FIG. 8. Additional examples are described elsewhere herein. Although method 500 is described with respect to performing backpropagation based on the prediction and the instance success label of the training example, in various implementations batch techniques can be utilized in which backpropagation is performed based on a loss determined based on a batch of predictions and instance success labels, of a batch of training examples.

Figure 6:
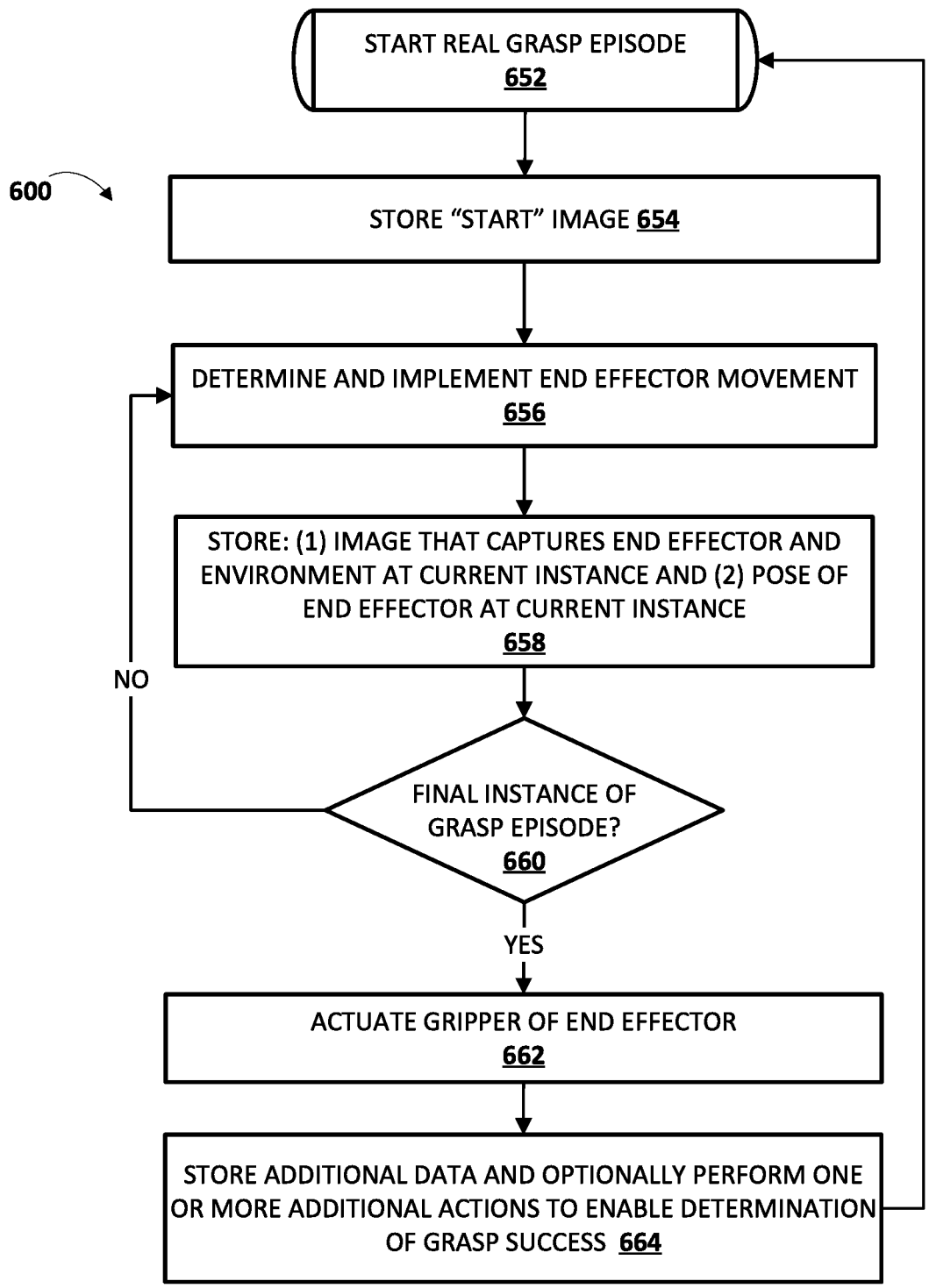
FIG. 6 is a flowchart illustrating an example method of performing real grasp episodes using a real robot.

FIG. 6 is a flowchart illustrating an example method 600 of performing real grasp episodes using a real robot.

At block 652, the system starts a grasp episode. At block 654, the system stores a "start" image that is an image at the beginning of the grasp episode. For example, the image can be an image of an environment of the robot without an end effector present in the image.

At block 656, the system determines and implements an end effector movement. For example, the system may generate one or more motion commands to cause one or more of the actuators that control the pose of the end effector to actuate, thereby changing the pose of the end effector. In some implementations and/or iterations of block 656, the motion command(s) may be random within a given space, such as the work-space reachable by the end effector, a restricted space within which the end effector is confined for the grasp episodes, and/or a space defined by position and/or torque limits of actuator(s) that control the pose of the end effector. Random as used herein may include truly random or pseudo-random. In some implementations, prior to the first iteration of block 656 the end effector may be randomly or otherwise moved "into position". For example, the end effector may be moved back to a set "starting position" and/or moved to a randomly selected position within a given space.

At block 658, the system stores: (1) an image that captures the end effector and the environment at the current instance of the grasp episode and (2) the pose of the end effector at the current instance. For example, the system may store a current image generated by a vision component associated with the robot and associate the image with the current instance (e.g., with a timestamp). Also, for example the system may determine the current pose of the end effector based on data from one or more joint position sensors of joints of the robot whose positions affect the pose of the robot, and the system may store that pose. The system may determine and store the pose of the end effector in task-space, joint-space, or another space.

At block 660, the system determines whether the current instance is the final instance for the grasp episode.

If the system determines at block 660 that the current instance is not the final instance for the grasp episode, the system returns to block 656, where it determines and implements another end effector movement, then proceeds to block 658 where it stores an image and the pose at the current instance. Through multiple iterations of blocks 656, 658, and 660 for a given grasp episode, the pose of the end effector will be altered by multiple iterations of block 656, and an image and the pose stored at each of those instances.

If the system determines at block 660 that the current instance is the final instance for the grasping attempt, the system proceeds to block 662, where it actuates the gripper of the end effector. For example, for an impactive gripper end effector, the system may cause one or more plates, digits, and/or other members to close. For instance, the system may cause the members to close until they are either at a fully closed position or a torque reading measured by torque sensor(s) associated with the members satisfies a threshold.

At block 664, the system stores additional data and optionally performs one or more additional actions to enable determination of the success of the grasp of block 662. In some implementations, the additional data stored to enable determination of success of the grasp is a position reading, a torque reading, and/or other reading from the grasping end effector.

The system can then proceed back to block 652 to start another real grasp episode.

In some implementations, the method 600 of FIG. 6 may be implemented on each of a plurality of robots, optionally operating in parallel during one or more (e.g., all) of their respective iterations of method 600. In some implementations, the objects that are reachable by a given robot and on which grasp episodes may be made may be different during different iterations of the method 600.

Figure 7:
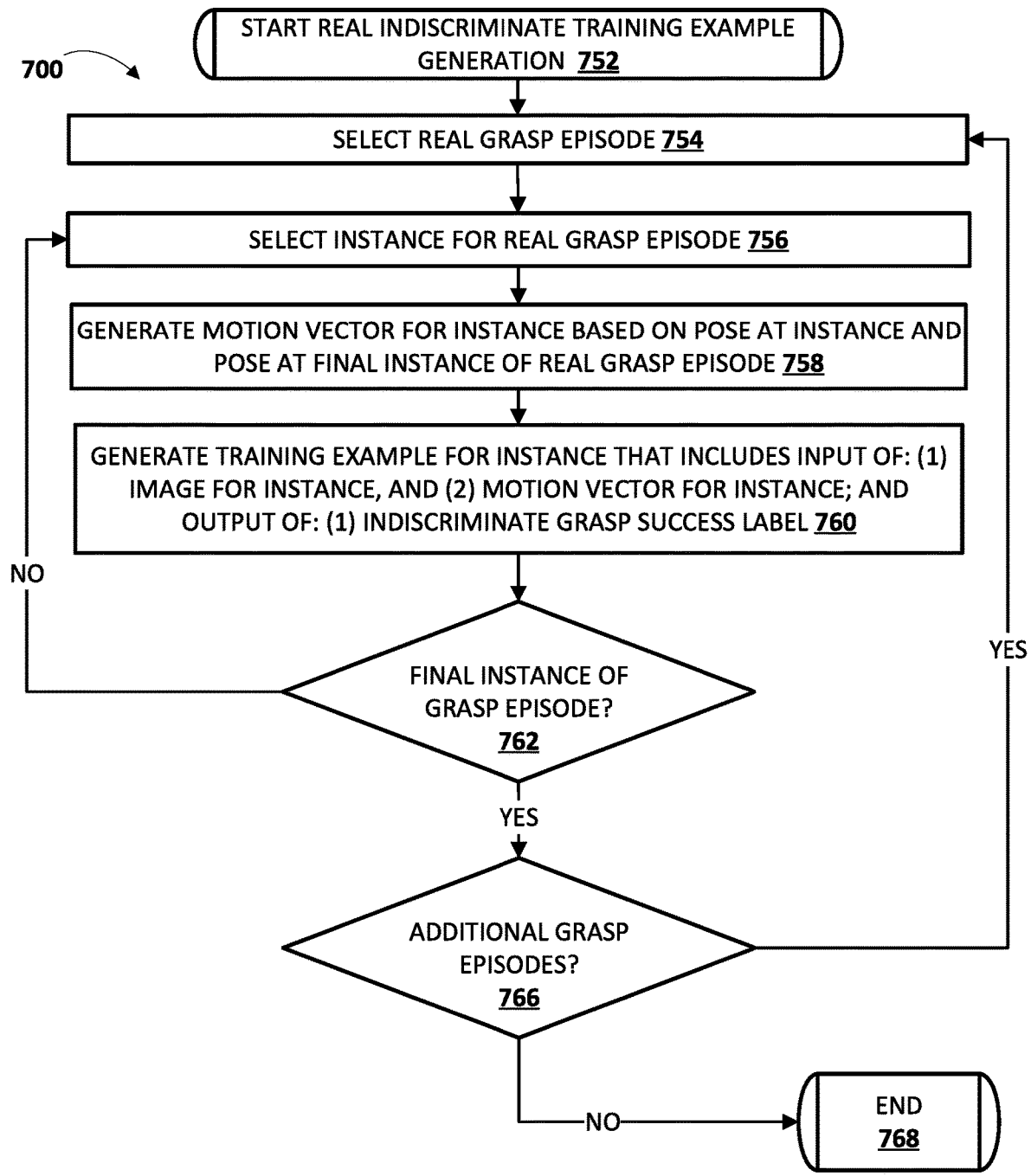
FIG. 7 is a flowchart illustrating an example method of generating real indiscriminate training examples based on real grasp episodes from real robot(s).

FIG. 7 is a flowchart illustrating an example method 700 of generating real indiscriminate training examples based on real grasp episodes from real robot(s).

At block 752, the system starts real indiscriminate training example generation. At block 754, the system selects a real grasp episode. For example, the system may access a database that includes data associated with a plurality of stored real grasp episodes, and select one of the stored grasp episodes. The selected grasp episode may be, for example, a grasp episode generated based on the method 600 of FIG. 6.

At block 756, the system selects an instance for the selected real grasp episode.

At block 758, the system generates a motion vector for the instance based on an end effector pose at the instance, and an end effector pose at a final instance of the real grasp episode.

At block 760, the system generates a real indiscriminate training example that includes input of: (1) an image for the instance, and (2) a motion vector for the instance; and output of: (1) an indiscriminate grasp success label for the grasp episode (i.e., based on whether the corresponding grasp episode resulted in a successful grasp of any object).

At block 762, the system determines whether the selected instance is the final instance of the real grasp episode. If the system determines the selected instance is not the final instance of the simulated real episode, the system returns to block 756 and selects another instance for the simulated grasp episode.

If, at block 762, the system determines the selected instance is the final instance of the real grasp episode, the system proceeds to block 766 and determines whether there are additional real grasp episodes to process. If the system determines there are additional real grasp episodes to process, the system returns to block 754 and selects another real grasp episode. In some implementations, determining whether there are additional grasp episode to process may include determining whether there are any remaining unprocessed real grasp episodes. In some implementations, determining whether there are additional real grasp episodes to process may additionally and/or alternatively include determining whether a threshold number of real indiscriminate training examples has already been generated and/or other criteria has been satisfied.

If the system determines there are not additional real grasp episodes to process, the system proceeds to block 768 and the method 700 ends. Another iteration of method 700 may be performed again.

Figure 8:
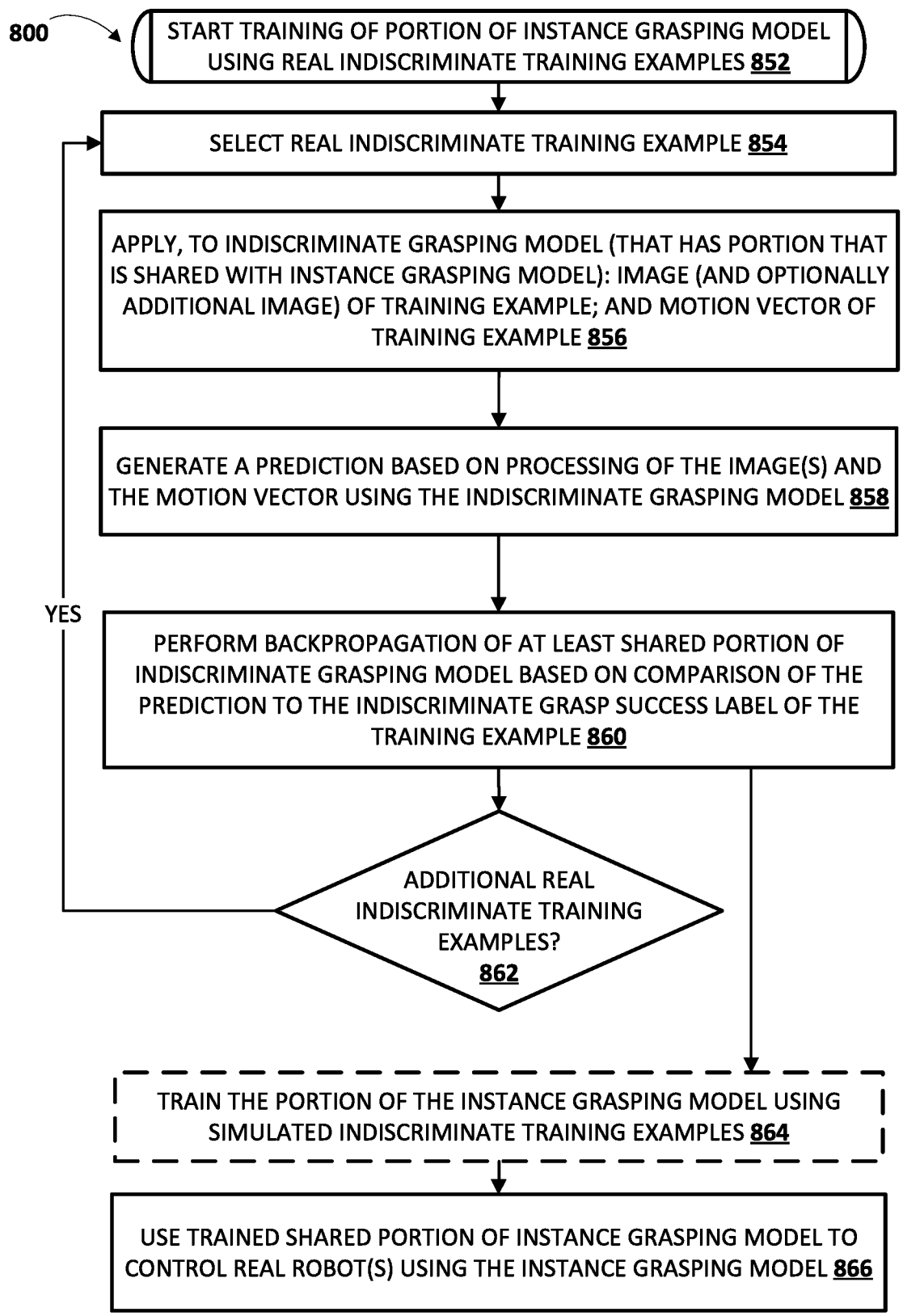
FIG. 8 is a flowchart illustrating an example method of updating at least a portion of an instance grasping model using real indiscriminate training examples.

FIG. 8 is a flowchart illustrating an example method 800 of updating at least a portion of an instance grasping model using real indiscriminate training examples. In some implementations, one or more iterations of method 800 can be performed in parallel with one or more iterations of method 500 of FIG. 5—and/or after one or more iterations of method 500 of FIG. 5

At block 852, the system starts training of at least a portion of an instance grasping model using real indiscriminate training examples. At block 854, the system selects a real indiscriminate training example.

At block 856, the system applies, to an indiscriminate grasping model: an image (and optionally an additional image) of the training example of block 854; and a motion vector of the training example. The indiscriminate grasping model has a portion that is shared with the instance grasping model. For example, during training, weights of the portion of the indiscriminate grasping model can be shared with the portion of the instance grasping model, and vice versa. The shared portion can be, for example, the first branch portion referenced in method 500 of FIG. 5.

At block 858, the system generates a prediction based on processing of the image(s) and the motion vector using the indiscriminate grasping model.

At block 860, the system performs backpropagation of at least the shared portion of the indiscriminate grasping model based on comparison of the prediction to the indiscriminate grasp success label of the training example of block 854. In some implementations, the backpropagation is performed based on a loss determined based on comparison of the prediction to the indiscriminate grasp success label of the training example of block 854. In some of those implementations, the loss is backpropagated across the entire indiscriminate grasping model. Also, in some of those implementations, a domain-adversarial similarity loss is also determined and utilized in the backpropagation.

As described herein, the backpropagation performed can update the weights of the shared portion, which can cause the weights of the shared portion to also be updated in the instance grasping model.

At block 862, the system determines whether additional real indiscriminate training examples are to be utilized in further training, which can be based on one or more criteria. If the system determines additional real indiscriminate training examples are to be utilized, the system proceeds back to block 854, selects an additional real indiscriminate training example, and performs blocks 856, 858, and 860 using the additional real indiscriminate training example.

In some implementations, the system also performs block 864. At block 864, the system also trains the portion of the indiscriminate grasping model using one or more simulated indiscriminate training examples. This can be similar (or the same) as blocks 854, 856, 858, 860, and 862 above—except that a simulated indiscriminate training example is utilized.

At block 866, the system uses the trained shared portion of the instance grasping model to control one or more real robots using the instance grasping model. This can be done after sufficient training based on method 500, method 800, and/or other methods described herein has been performed. Although method 800 is described with respect to performing backpropagation based on the prediction and the indiscriminate grasp success label of the training example, in various implementations batch techniques can be utilized in which backpropagation is performed based on a loss determined based on a batch of predictions and indiscriminate grasp success labels, of a batch of training examples.

Figure 9:
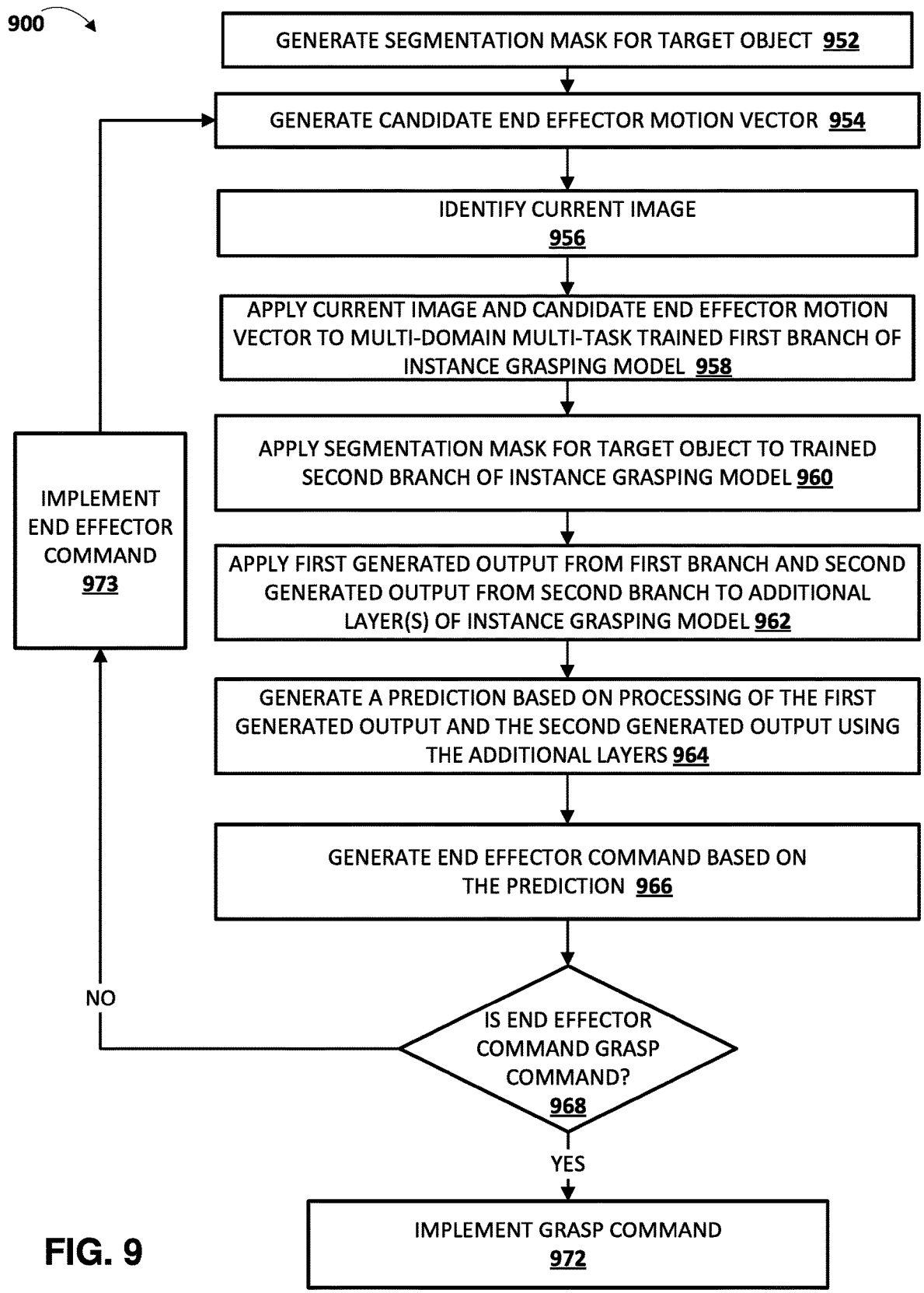
FIG. 9 is a flowchart illustrating an example method of utilizing an instance grasping model to servo a grasping end effector to grasp a target object.

Once an instance grasping model is trained according to techniques described herein, it may be utilized by a real physical robot to servo a grasping end effector to grasp a target object. With reference to FIG. 9, a flowchart illustrating an example method 900 of utilizing an instance grasping model to servo a grasping end effector to grasp a target object is illustrated.

At block 952, the system generates a segmentation mask for a target object. In some implementations, the segmentation mask can be generated based on a user, through user interface input, encircling or otherwise indicating a target object in an image captured by a camera of a robot. For example, the segmentation mask can be generated to conform to the indicated object. In some implementations, user interface input and/or a higher level task planner can provide a semantic indication of a target object, and the semantic indication can be utilized to generate the segmentation mask. For example, if a "cup" is indicated in the semantic indication, one or more automated segmentation techniques can be utilized to determine a segmentation mask that encompasses a cup in an image. As one non-limiting example, Mask-RCNN can be utilized.

At block 954, the system generates a candidate end effector motion vector. The candidate end effector motion vector may be defined in task-space, joint-space, or other space, depending on the input parameters of the trained instance grasping model to be utilized in further blocks. In some implementations, the system generates a candidate end effector motion vector that is random within a given space, such as the work-space reachable by the end effector, a restricted space within which the end effector is confined for the grasp episodes, and/or a space defined by position and/or torque limits of actuator(s) that control the pose of the end effector.

In some implementations the system may utilize one or more techniques to sample a group of candidate end effector motion vectors and to select a subgroup from the sampled group. For example, the system may utilize an optimization technique, such as the cross-entropy method (CEM). CEM is a derivative-free optimization algorithm that samples a batch of N values at each iteration, fits a Gaussian distribution to M<N of these samples, and then samples a new batch of N from this Gaussian. For instance, the system may utilize CEM and values of M=64 and N=6, and perform three iterations of CEM to determine a best available (according to the CEM) candidate end effector motion vector. In some implementations, one or more constraints may be imposed on the candidate end effector motion vector that can be generated at block 752. For example, the candidate end effector motions evaluated by CEM or other technique may be constrained based on the constraints. One example of constraints are computer generated and/or human inputted constraints (e.g., via a user interface input device of a computer system) that imposes constraints on area(s) in which grasps may be attempted, constraints on particular object feature(s) on which grasps may be attempted, etc. Yet other examples of constraints include, for example, constraints based on a workspace of the robot, joint limits of the robot, torque limits of the robot, constraints provided by a collision avoidance system and that restrict the movement of the robot to prevent collision with one or more objects, etc.

At block 956, the system identifies a current image, such as a current image that captures the end effector and one or more environmental objects. In some implementations, the system also identifies an additional image, such as an additional image captured at the start of the servoing to grasp. In some implementations, the additional image captured by a vision component when the end effector was at least partially out of view of the vision component.

At block 958, the system applies the current image (and optionally the additional image) and the candidate end effector motion vector to a multi-domain multi-task trained first branch of an instance grasping model.

At block 960, the system applies the segmentation mask for the target object to a trained second branch of the instance grasping model.

At block 962, the system applies first generated output from the first branch and second generated output from the second branch to additional layer(s) of the instance grasping model.

At block 964, the system generates a prediction based on processing of the first generated output and the second generated output using the additional layers of the instance grasping model. The prediction is an instance prediction. That is, it predicts the likelihood of successful grasp of the target object indicated by the segmentation mask.

At block 966, the system generates an end effector command based on the generated prediction of block 964. Generally, at block 966, the system generates an end effector command that seeks to achieve (through one or more iterations of method 900) a successful grasp that is of the target object indicated in the semantic mask. As one example, if the prediction of block 964 satisfies a threshold, block 966 can generate an end effector command that corresponds to the end effector motion vector of block 954 (then a grasp optionally performed).

In some implementations multiple candidate end effector motion vectors are considered in a given iteration of method 900 and a prediction determined for each of the candidate end effector motion vectors (all based on the same current image). In some of those implementations, at block 966 the system determines the end effector motion vector with a prediction that is most indicative of success, and generates an end effector command that corresponds to that end effector motion vector.

In some iterations of block 966, the system additionally and/or alternatively generates the end effector command based on a current prediction if no candidate end effector motion vector is utilized to generate new motion commands. For example, if one or more comparisons of the current prediction to the prediction generated at block 964 fail to satisfy a threshold, then the end effector motion command may be a "grasp command" that causes the end effector to attempt a grasp (e.g., close digits of an impactive gripping end effector). For instance, if the result of the current prediction divided by the prediction generated at block 966 is greater than or equal to a first threshold (e.g., 0.9), the end effector command may be a grasp command (under the rationale of stopping the grasp early if closing the gripper is nearly as likely to produce a successful grasp as moving it). The end effector command generated by the system may be a single group of one or more commands, or a sequence of groups of one or more commands.

The current prediction if no candidate end effector motion vector is utilized to generate new motion commands may be based on the prediction in a previous iteration of the method 900 and/or based on applying a "null" motion vector at an additional iteration of block 958, and generating the current prediction based on the additional iteration that applies the "null" motion vector.

At block 968, the system determines whether the end effector command is a grasp command. If the system determines at block 968 that the end effector command is a grasp command, the system proceeds to block 968 and implements the grasp command. In some implementations, the system may optionally determine whether the grasp command results in a successful grasp (e.g., using techniques described herein) and, if not successful, the system may optionally adjust the pose of the end effector and return to block 954. Even where the grasp is successful, the system may return to block 952 at a later time to grasp another object.

If the system determines at block 968 that the end effector command is not a grasp command (e.g., it is a motion command), the system proceeds to block 973 and implements the end effector command, then returns to blocks 954, where it generates another candidate end effector motion vector.

In many implementations, blocks of method 900 may be performed at a relatively high frequency, thereby enabling iterative updating of end effector commands and enabling servoing of the end effector along a trajectory that is informed by the trained instance grasping model to lead to a relatively high probability of successful grasp of the target object.

Figure 10:
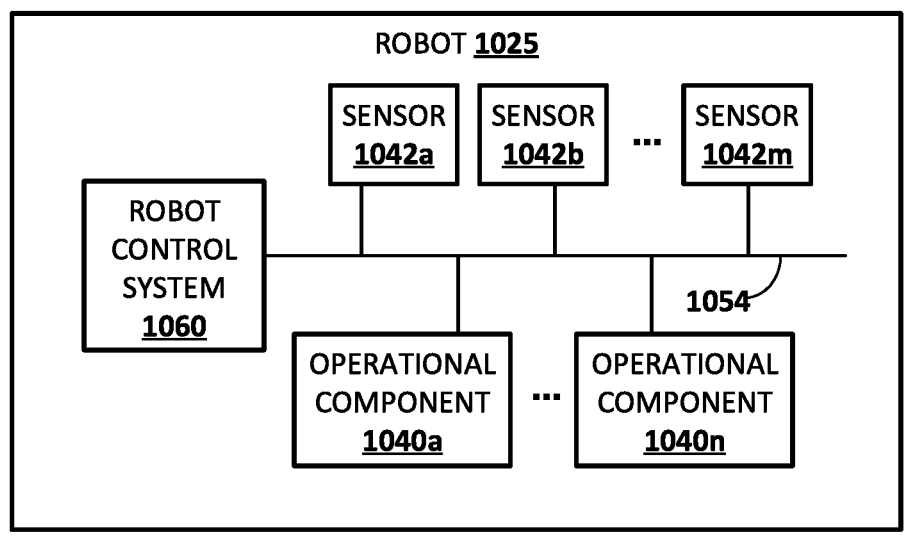
FIG. 10 schematically depicts an example architecture of a robot.

FIG. 10 schematically depicts an example architecture of a robot 1025. The robot 1025 includes a robot control system 1060, one or more operational components 1025a-1025n, and one or more sensors 1042a-1042m. The sensors 1042a-1042m may include, for example, vision components, light sensors, pressure sensors, pressure wave sensors (e.g., microphones), proximity sensors, accelerometers, gyroscopes, thermometers, barometers, and so forth. While sensors 1042a-m are depicted as being integral with robot 1025, this is not meant to be limiting. In some implementations, sensors 1042a-m may be located external to robot 1025, e.g., as standalone units.

Operational components 1025a-1025n may include, for example, one or more end effectors and/or one or more servo motors or other actuators to effectuate movement of one or more components of the robot. For example, the robot 1025 may have multiple degrees of freedom and each of the actuators may control actuation of the robot 1025 within one or more of the degrees of freedom responsive to the control commands. As used herein, the term actuator encompasses a mechanical or electrical device that creates motion (e.g., a motor), in addition to any driver(s) that may be associated with the actuator and that translate received control commands into one or more signals for driving the actuator. Accordingly, providing a control command to an actuator may comprise providing the control command to a driver that translates the control command into appropriate signals for driving an electrical or mechanical device to create desired motion.

The robot control system 1060 may be implemented in one or more processors, such as a CPU, GPU, and/or other controller(s) of the robot 1025. In some implementations, the robot 1025 may comprise a "brain box" that may include all or aspects of the control system 1060. For example, the brain box may provide real time bursts of data to the operational components 1025*a-n*, with each of the real time bursts comprising a set of one or more control commands that dictate, inter alia, the parameters of motion (if any) for each of one or more of the operational components 1025*a-n*. In some implementations, the robot control system 1060 may perform one or more aspects of one or more methods described herein.

As described herein, in some implementations all or aspects of the control commands generated by control system 1060 in positioning an end effector to grasp a target object may be based on end effector commands generated based on utilization of an instance grasping model. For example, a vision component of the sensors 1042*a-m* may capture a current image and an additional image, and the robot control system 1060 may generate a candidate motion vector and a segmentation mask of a target object. The robot control system 1060 may provide the current image, the additional image, the candidate motion vector, and the segmentation mask to a trained instance grasping model and utilize a prediction generated based on the applying to generate one or more end effector control commands for controlling the movement and/or grasping of an end effector of the robot. Although control system 1060 is illustrated in FIG. 10 as an integral part of the robot 1025, in some implementations, all or aspects of the control system 1060 may be implemented in a component that is separate from, but in communication with, robot 1025. For example, all or aspects of control system 1060 may be implemented on one or more computing devices that are in wired and/or wireless communication with the robot 1025, such as computing device 1110.

Figure 11:
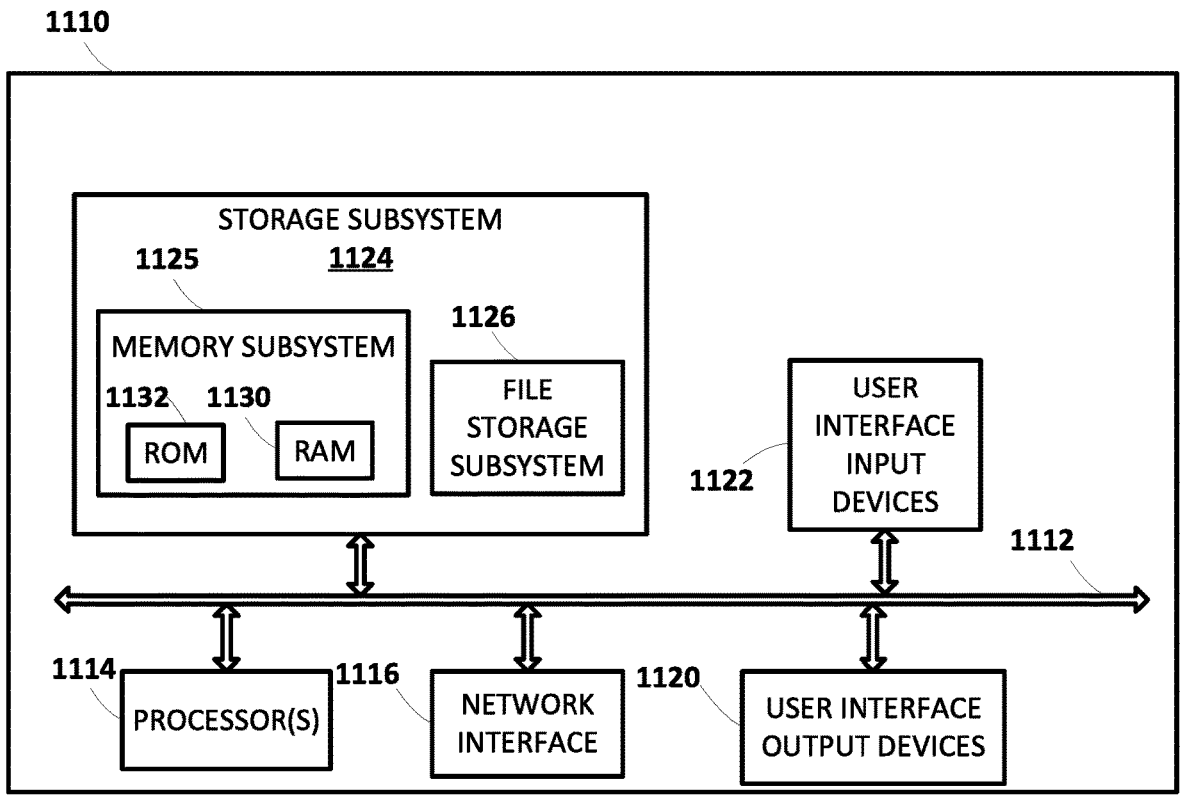
FIG. 11 schematically depicts an example architecture of a computer system.

FIG. 11 is a block diagram of an example computing device 1110 that may optionally be utilized to perform one or more aspects of techniques described herein. For example, in some implementations computing device 1110 may be utilized to provide desired object semantic feature(s) for grasping by robot 825 and/or other robots. Computing device 1110 typically includes at least one processor 1114 which communicates with a number of peripheral devices via bus subsystem 1112. These peripheral devices may include a storage subsystem 1124, including, for example, a memory subsystem 1125 and a file storage subsystem 1126, user interface output devices 1120, user interface input devices 1122, and a network interface subsystem 1116. The input and output devices allow user interaction with computing device 1110. Network interface subsystem 1116 provides an interface to outside networks and is coupled to corresponding interface devices in other computing devices.

User interface input devices 1122 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 1110 or onto a communication network.

User interface output devices 1120 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 1110 to the user or to another machine or computing device.

Storage subsystem 1124 stores programming and data constructs that provide the functionality of some or all of the modules described herein. For example, the storage subsystem 1124 may include the logic to perform selected aspects of one or more methods described herein.

These software modules are generally executed by processor 1114 alone or in combination with other processors. Memory 1125 used in the storage subsystem 1124 can include a number of memories including a main random access memory (RAM) 1130 for storage of instructions and data during program execution and a read only memory (ROM) 1132 in which fixed instructions are stored. A file storage subsystem 1126 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 1126 in the storage subsystem 1124, or in other machines accessible by the processor(s) 1114.

Bus subsystem 1112 provides a mechanism for letting the various components and subsystems of computing device 1110 communicate with each other as intended. Although bus subsystem 1112 is shown schematically as a single bus, alternative implementations of the bus subsystem may use multiple busses.

Computing device 1110 can be of varying types including a workstation, server, computing cluster, blade server, server farm, or any other data processing system or computing device. Due to the ever-changing nature of computers and networks, the description of computing device 1110 depicted in FIG. 11 is intended only as a specific example for purposes of illustrating some implementations. Many other configurations of computing device 1110 are possible having more or fewer components than the computing device depicted in FIG. 11.

What is claimed is:

1. A method implemented by one or more processors of a robot, comprising:
    identifying an image captured by a vision component associated with the robot;
    identifying a target object captured by the image;
    generating a target object input that denotes position of the target object in the image;
    generating a candidate end effector motion vector defining motion to move a grasping end effector of the robot from a current pose to an additional pose;
    identifying a current image captured by the vision component, the current image capturing the grasping end effector and at least the target object;
    processing the current image, the candidate end effector motion vector, and the target object input using a trained instance grasping model;
    generating, based on the processing, a prediction of successful grasp of the target object with application of the motion defined by the candidate end effector motion vector;
    generating an end effector command based on the prediction of successful grasp of the target object; and
    providing the end effector command to one or more actuators of the robot.

2. The method of claim 1, wherein the target object input is a segmentation mask that is at least a partial segmentation of the target object in the image.

3. The method of claim 2, wherein the segmentation mask is determined based on the image.

4. The method of claim 2, wherein the image comprises multiple channels and a given quantity of pixels in each of the channels, and wherein the segmentation mask has the same quantity of pixels as the image, but includes only a single channel.

5. The method of claim 4, wherein the position of the target object in the image is denoted, in the segmentation mask, by a subset of pixels, in the single channel, that all have a first value that varies from a second value of all other pixels, in the single channel, that are not in the subset of pixels.

6. The method of claim 5, wherein the subset of pixels correspond to a predicted location of where the target object is present in the image.

7. The method of claim 5, wherein the subset of pixels correspond to one or more predicted locations of where the target object is present in the image.

8. The method of claim 5, wherein the subset of pixels correspond to a bounding box that surrounds the predicted locations of where the target object is present in the image.

9. The method of claim 5, wherein the subset of pixels consist of a center pixel that is centered on the target object in the image.

10. The method of claim 1, wherein the target object input is a bounding box that encompasses the target object in the image.

11. A robot, comprising:
an end effector;
actuators;
a vision component;
memory;
one or more processors executing instructions stored in the memory to:
identify an image captured by the vision component;
identify a target object captured by the image;
generate a target object input that denotes position of the target object in the image;
generate a candidate end effector motion vector defining motion to move the end effector from the current pose to an additional pose;
identify a current image captured by the vision component, the current image capturing the grasping end effector and at least the target object;
process the current image, the candidate end effector motion vector, and the target object input using a trained instance grasping model;
generate, based on the processing, a prediction of successful grasp of the target object with application of the motion defined by the candidate end effector motion vector;
generate an end effector command based on the prediction of successful grasp of the target object; and
provide the end effector command to one or more of the actuators of the robot.

12. The robot of claim 11, wherein the target object input is a segmentation mask that is at least a partial segmentation of the target object in the image.

13. The robot of claim 12, wherein the segmentation mask is determined based on the image.

14. The robot of claim 12, wherein the image comprises multiple channels and a given quantity of pixels in each of the channels, and wherein the segmentation mask has the same quantity of pixels as the image, but includes only a single channel.

15. The robot of claim 14, wherein the position of the target object in the image is denoted, in the segmentation mask, by a subset of pixels, in the single channel, that all have a first value that varies from a second value of all other pixels, in the single channel, that are not in the subset of pixels.

16. The robot of claim 15, wherein the subset of pixels correspond to a predicted location of where the target object is present in the image.

17. The robot of claim 15, wherein the subset of pixels correspond to one or more predicted locations of where the target object is present in the image.

18. The robot of claim 15, wherein the subset of pixels correspond to a bounding box that surrounds the predicted locations of where the target object is present in the image.

19. The robot of claim 15, wherein the subset of pixels consist of a center pixel that is centered on the target object in the image.

20. The robot of claim 11, wherein the target object input is a bounding box that encompasses the target object in the image.

* * * * *